US006997082B2

(12) United States Patent
Snyder et al.

(10) Patent No.: US 6,997,082 B2
(45) Date of Patent: Feb. 14, 2006

(54) ADJUSTABLE BED

(75) Inventors: Steven Snyder, Amherst, OH (US); Howard Loewenthal, Hinckley, OH (US); Andrew Spriegel, Avon, OH (US); Gerold Goertzen, Brunswick, OH (US); Robert Puckett, Orlando, FL (US); Kevin Wysocki, Grafton, OH (US)

(73) Assignee: Invacare Incorporated, Elyria, OH (US)

(*) Notice: Subject to any disclaimer, the term of this patent is extended or adjusted under 35 U.S.C. 154(b) by 53 days.

(21) Appl. No.: 10/695,250

(22) Filed: Oct. 27, 2003

(65) Prior Publication Data

US 2004/0148698 A1 Aug. 5, 2004

Related U.S. Application Data

(63) Continuation-in-part of application No. 10/280,927, filed on Oct. 25, 2002.

(51) Int. Cl.
*F16H 57/02* (2006.01)

(52) U.S. Cl. .................................... 74/606 R; 220/525

(58) Field of Classification Search ............... 74/606 R, 74/608, 609, 612, 616; 220/525, 526; 464/170, 464/176, 177

See application file for complete search history.

(56) References Cited

U.S. PATENT DOCUMENTS 166,102 A * 7/1875 Hennaman et al. ......... 220/525
1,275,695 A * 8/1918 Iverson ....................... 220/525
2,522,759 A 9/1950 Lindquist
2,958,438 A * 11/1960 Severson .................... 220/525
3,015,113 A 1/1962 Wallen
3,105,246 A 10/1963 Emrick
4,846,011 A 7/1989 Gaffney
5,134,731 A 8/1992 Quintile et al.
5,685,035 A 11/1997 Urness et al.
5,713,091 A 2/1998 Houchin
5,802,639 A 9/1998 Raasch et al.
5,964,347 A 10/1999 Urness
6,000,077 A 12/1999 Cyr
6,230,344 B1 5/2001 Thompson et al.

FOREIGN PATENT DOCUMENTS

GB 855930 12/1960
WO WO 2004/037043 A2 5/2004

OTHER PUBLICATIONS

Invacare; Electric and Manual Beds; Service Manual; Form No. 93–152: P/N 51000M493: Rev. H (3) 599.
Information Disclosure Statement mailed Nov. 5, 2004.
Information Disclosure Statement mailed Mar. 21, 2003.
International Search Report and Written Opinion for PCT/US2004/018735.

* cited by examiner

*Primary Examiner*—Chong H. Kim
(74) *Attorney, Agent, or Firm*—Calfee, Halter & Griswold LLP

(57) ABSTRACT

An adjustable bed includes a universal, or interchangeable, bed end that can be used at either end of the bed and can be connected with an existing motor drive assembly. The bed end may include a gear box having first and second input shafts that are selectively covered by a movable cover. The bed end may include a frame having drain openings for draining water from the bed end when the bed end is washed. The bed end may also include an end cap that is fastened to the frame in a unique manner, and that helps to maintain a panel of the bed end cover in a curved or bowed configuration.

23 Claims, 18 Drawing Sheets

ADJUSTABLE BED

RELATED APPLICATIONS

This application is a continuation in part of U.S. application Ser. No. 10/280,927, filed Oct. 25, 2002, titled ADJUSTABLE HEIGHT BED.

TECHNICAL FIELD

The present invention relates to an adjustable bed. In particular, the present invention relates to a bed having a bed spring or other portion that is vertically adjustable, for example, for use in home health care.

BACKGROUND OF THE INVENTION

Adjustable beds are often used in home health care. Such beds typically include a height adjustment mechanism that is operable to raise or lower the bed spring. The height adjustment mechanism may be manual or electric. A manual mechanism uses a hand crank to operate a gearbox to raise and lower the bed spring. An electric mechanism uses an electric motor that rotates a drive shaft or drive tube. The drive shaft is connected with gearboxes that face inward on the respective bed ends, that is, toward the opposite end. When the motor is actuated, rotational force is transmitted to the bed ends to synchronously raise and lower movable portions of the bed ends that support the bed spring. One such type of adjustable bed end is shown in U.S. Pat. No. 5,134,731, the entire disclosure of which is incorporated herein by reference.

Since the rotational force acts in the same direction of rotation at both ends of the bed, identical head and foot bed ends are not used because their gearboxes would cause one bed end to raise and the other bed end to lower. As a result, separate head ends and foot ends are typically provided for an adjustable bed. This results in the need to manufacture and store two different kinds of bed ends, and can cause mistakes when delivering and setting up a bed in a patient's home.

SUMMARY OF THE INVENTION

The present invention relates to an adjustable bed and to various features of the bed. In various embodiments, the bed includes a universal, or interchangeable, bed end that can be used at either end of the bed and can be connected with an existing motor drive assembly. The bed end may include a gear box having first and second input shafts that are selectively covered by a movable cover. The bed end may include a frame having drain openings for draining water from the bed end when the bed end is washed. The bed end may also include an end cap that is fastened to the frame in a unique manner, and that helps to maintain a panel of the bed end cover in a curved or bowed configuration.

BRIEF DESCRIPTION OF THE DRAWINGS

The foregoing and other features of the present invention will become apparent to one skilled in the art to which the present invention relates upon consideration the following description of the invention with reference to the accompanying drawings, in which.

DETAILED DESCRIPTION OF THE INVENTION

Figure 1:
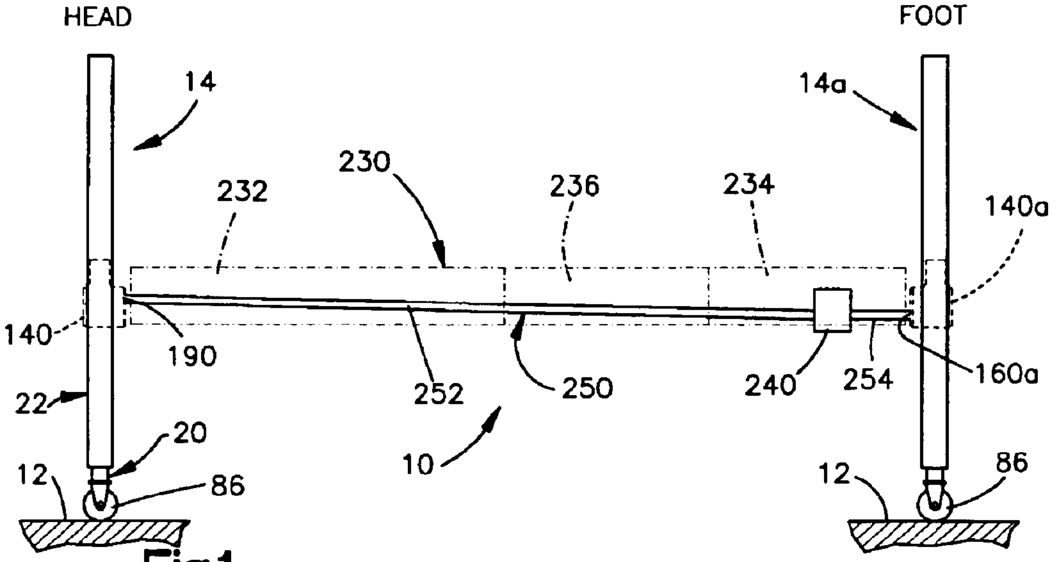
FIG. 1 is a schematic elevational view of one embodiment of an adjustable bed in accordance with the present invention.

The present invention relates to adjustable beds. In particular, the present invention relates to a bed having a bed spring or other portion that is vertically adjustable, for example, for use in home health care. As representative of the present invention, FIG. 1 illustrates one embodiment of a bed 10. The bed 10 is illustrated as being placed on a floor 12.

The bed 10 includes a bed end 14 that is located at the head end of the bed. The bed 10 also includes a bed end **14*a* that is located at the foot end of the bed. The bed end 14 is referred to herein as the "head end" of the bed 10. The bed end 14*a* is referred to herein as the "foot end" of the bed 10. The head end 14 of the bed 10 is identical to, and interchangeable with, the foot end 14*a*** of the bed, as is discussed in more detail below.

The head end 14 of the bed 10 (FIG. 2) includes a fixed portion 20 and a movable portion 22. The fixed portion 20 of the head end 14 is that portion of the head end 14 that stays in position on the floor 12 when the height of the bed 10 is adjusted. The movable portion 22 of the head end 14 is that portion of the head end that moves vertically relative to the floor 12 and relative to the fixed portion 20 of the head end, when the height of the bed 10 is adjusted. This movement effects vertical movement of the portions of the bed on which the patient is located, as discussed below.

The fixed portion 20 of the head end 14 (FIG. 2) includes first and second inner legs 24 and 26 that are interconnected by a cross-beam 28. The inner legs 24 and 26 are identical to each other in construction and so their constituent parts are numbered identically.

Each one of the inner legs 24 and 26 has a square, tubular cross-sectional configuration with an inner side wall 30 that faces the opposite side of the bed end 14. Each one of the inner legs 24 and 26 has an upper end portion 32 and an opposite lower end portion 34. The inner legs 24 and 26 extend generally perpendicular to the floor 12 when the bed 10 is assembled as shown in the drawings.

The cross-beam 28 has a tubular, rectangular cross-sectional configuration that extends perpendicular to the inner legs 24 and 26 and parallel to the floor 12. The cross-beam 28 has opposite upper and lower side walls 48 and 50 and opposite inner and outer side walls. The cross-beam 28 also has first and second end walls 48 and 50 that close the ends of the cross-beam and provide a mounting structure for supporting the cross-beam.

The cross-beam 28 is connected between the upper end portions 32 of the inner legs 24 and 26, respectively. Specifically, the first end wall 48 of the cross-beam 28 is fixedly secured to the upper end portion 32 of the first leg 24, specifically, the inner side wall 30, by fastener structure that, in the illustrated embodiment, includes a plurality of bolts 52. In a similar manner, the second end wall 50 of the cross-beam 28 is fixedly secured to the upper end portion 32 of the second leg 26, specifically, the inner side wall 30, by fastener structure that, in the illustrated embodiment, includes a plurality of bolts 54. As a result, the cross-beam 28 and the first and second inner legs 24 and 26 are fixed to each other as one unit that rests on the floor 12 and that does not move vertically when the height of the bed 10 is adjusted as described below. These three pieces together form the fixed portion 20 of the head end 14. It should be understood that the cross-beam 28 could be configured differently, so long as it comprises structure that rigidly joins the inner legs 24 and 26 for transmitting force between the movable portions 22 of the bed end 14 and the fixed portion 20 of the bed end.

The movable portion 22 of the head end 14 of the bed 10 includes structural and operational parts, as well as decorative/covering parts. The decorative/covering parts are not shown in FIGS. 1–6, so that the structural and operational parts can be viewed. The decorative/covering parts are described below.

The movable portion 22 of the head end 14 includes a frame structure, or frame 60. The frame 60 includes an upper cross bar 62, a lower cross bar 64, and first and second outer legs 66 and 68. The upper cross bar 62 has a tubular cross-sectional configuration that extends perpendicular to the outer legs 66 and 68 and parallel to the floor 12. The upper cross bar 62 has first and second end portions 70 and 72. The lower cross bar 64 has a tubular cross-sectional configuration that extends perpendicular to the outer legs 66 and 68 and parallel to the floor 12. The lower cross bar 64 has first and second end portions 74 and 76.

The first and second outer legs 66 and 68 of the frame 60 are identical to each other and so their constituent parts are numbered identically. Each one of the outer legs 66 and 68 has a square, tubular cross-sectional configuration with an inner major side wall 78 that faces the opposite side (left to right as viewed in FIG. 2) of the bed end 14. Each one of the outer legs 66 and 68 has an upper end portion 80 and an opposite lower end portion 82. The outer legs 66 and 68 extend perpendicular to the floor 12 when the bed 10 is assembled as shown in the drawings.

The first and second end portions 70 and 72 of the upper cross bar 62 are fixed to the upper end portions 80 of the first and second outer legs 66 and 68, respectively, by welding, for example. The first and second end portions 74 and 76 of the lower cross bar 64 are fixed to the first and second outer legs 66 and 68, respectively, by welding, for example. As a result, the upper and lower cross bars 62 and 64, and the first and second outer legs 66 and 68, are fixed to each other as one unit that is movable vertically when the height of the bed 10 is adjusted as described below.

The first and second inner legs 24 and 26 of the head end 14 of the bed 10 are telescopically received in the first and second outer legs 66 and 68 of the head end, respectively. The inner legs 24 and 26 are smaller in cross-sectional configuration than the outer legs 66 and 68 and are slidable within the outer legs. When the inner legs 24 and 26 are thus assembled with the outer legs 66 and 68, the lower end portions 34 of the inner legs project from the outer legs. Casters or other floor-engaging structure 86 (FIG. 1) may be fixed to the lower end portions 34 of the inner legs 24 and 26.

The inner side wall 78 of the first outer leg 66 is cut away or relieved in a known manner to allow travel clearance for the bolts 52 when the first inner leg 24 moves vertically relative to the first outer leg. In a similar manner, the inner side wall 78 of the second outer leg 68 is cut away or relieved in a known manner to allow travel clearance for the bolts 54 when the second inner leg 26 moves vertically relative to the second outer leg. As a result, the entire movable portion 22 of the head end 14, including the upper and lower cross bars 62 and 64 and the first and second outer legs 66 and 68, is movable vertically as one unit, relative to the fixed portion 20 of the head end, when the height of the bed 10 is adjusted as described below.

The movable portion of the head end 14 of the bed 10 includes a drive assembly 90 for receiving rotational force and, in response, moving the movable portion 22 of the head end vertically relative to the fixed portion 20 of the head end. The drive assembly 90 includes a gearbox 140, described below in detail, that is fixed in position on the lower cross bar 64 of the frame 60.

The drive assembly 90 also includes an externally threaded acme screw or lead screw 92. The lead screw 92 is mounted generally vertically in the frame 60. An upper end portion 94 of the lead screw 92 is supported on the upper cross bar 62 for rotational movement relative to the frame 60 about a drive axis 96. An upper screw pin 98 (FIG. 3) projects radially outward from the lead screw 92 near the upper end portion 94 of the lead screw. The upper end portion 94 of the lead screw 92 is not movable axially relative to the upper cross bar 62.

A lower end portion 100 of the lead screw 92 (FIG. 5) is supported on the gearbox 140 in a manner described below for rotation relative to the frame 60. The lower end portion 100 of the lead screw 92 includes an axially projecting tenon 102 that forms the lower terminal end of the lead screw. The lower end portion 100 of the lead screw 92 is not movable axially relative to the lower cross bar 64. As a result, the lead screw 92 is fixed for movement vertically with the frame 60 and with the other parts of the movable portion 22 of the head end 14.

The drive assembly 90 of the head end 10 also includes a slip nut assembly 104 (FIGS. 3 and 4) for transmitting force between the lead screw 92 and the cross-beam 28. The slip nut assembly 104 includes a slip nut housing 106. The nut housing 106 is fixed by bolts 108 to the upper side wall 40 of the cross-beam 28, at a location inside the cross-beam. As a result, the slip nut housing 104 is rigidly coupled by the cross-beam 28 to the inner legs 24 and 26.

The slip nut assembly 104 also includes a slip nut. The slip nut may be of the one-piece type shown in U.S. Pat. No. 5,134,731, entitled Adjustable Bed Having Adjustable Height Legs With Synchronization Feature, the entire subject matter of which is hereby incorporated by reference.

Figure 3:
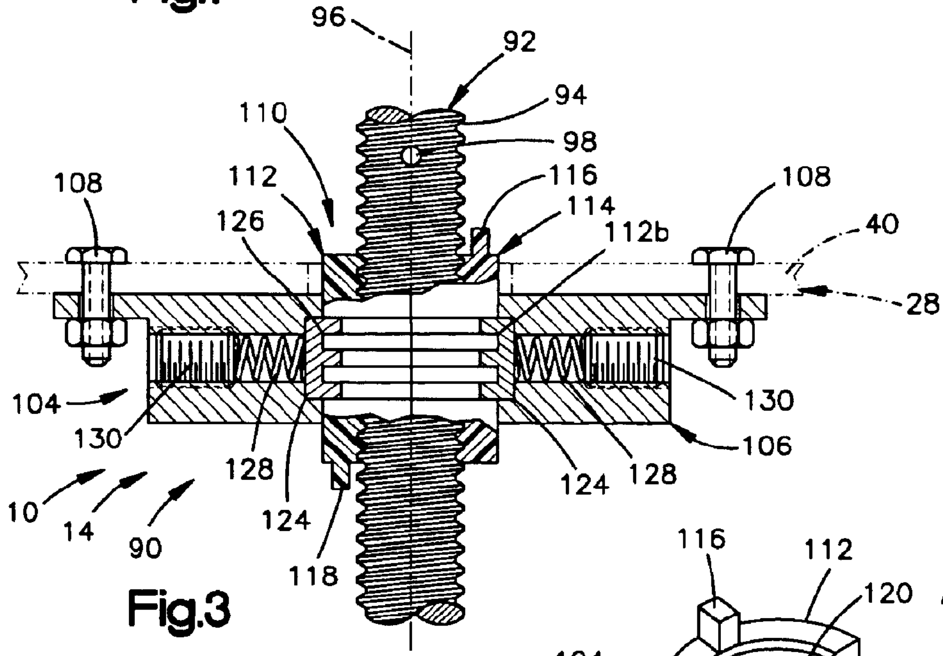
FIG. 3 is a sectional view of one embodiment of a slip nut assembly that forms part of the bed end of FIG. 2.
Figure 4:
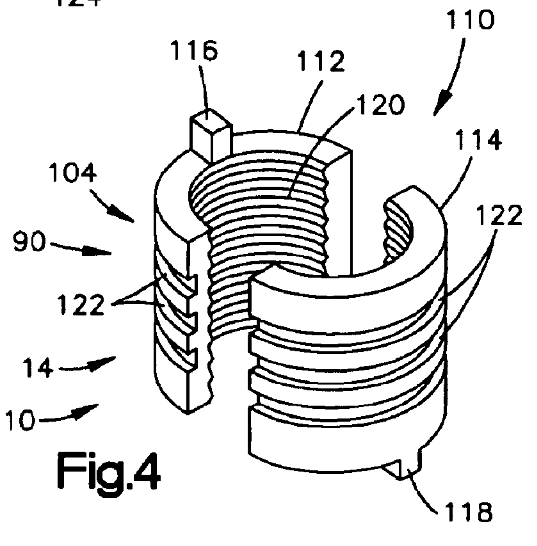
FIG. 4 is a perspective view of one embodiment of a slip nut that forms part of the slip nut assembly of FIG. 3.

Alternatively, and as preferred, the slip nut assembly 104 includes a slip nut 110 as shown and described herein. The slip nut 110 is formed as two separate pieces 112 and 114, as seen in FIGS. 3 and 4. The first and second slip nut halves 112 and 114 are formed by casting or molding. The first and second slip nut halves 112 and 114 are identical to each other.

An upper slip nut pin 116 is formed as one piece with the first slip nut half 112. A lower slip nut pin 118 is formed as one piece with the second slip nut half 114. The upper and lower slip nut pins 116 and 118 project axially from opposite upper and lower end surfaces of the slip nut 110. The two slip nut halves 112 and 114 when placed together as shown in FIG. 3 define an internal thread convolution 120 into which the lead screw 92 is threaded. A plurality of circumferential grooves 122 are formed on the outer surface of the slip nut 110. The grooves 122 do not extend helically but rather extend perpendicular to the drive axis 96.

The slip nut assembly 104 further includes a pair of pressure plates 124 mounted in the slip nut housing 106. The pressure plates 124 have internal grooves 126 that mesh with the external grooves 122 on the slip nut 110 to provide for relative rotation, without relative axial movement, between the slip nut and the pressure plates. The pressure plates 124 are movable laterally in the slip nut housing 106 (left to right as viewed in FIG. 3) but are blocked from rotation within the housing about the axis 96.

A pair of springs 128 are associated with the pressure plates 124. Each spring 128 is biased against its associated pressure plate 124 by a respective set screw 130 that is screwed into the slip nut housing 106. The springs 128 urge the pressure plates radially inward against the slip nut halves 112 and 114, which are, thereby, urged radially inward against the lead screw 92.

The gearbox 140 (FIGS. 2, 5 and 6) is fixed to the frame 60 and is operable to receive rotational force from outside the head end 14 of the bed 10 and, in response, effect rotation of the lead screw 92 about the drive axis 96. The gearbox 140 includes a housing 142. The gearbox housing 142 has a main body portion 144 and an output portion 146 that projects upward from the main body portion. The gearbox 140 is oriented relative to the frame 60 so that the drive axis 96 extends vertically into the output portion 146 of the housing 142. The gearbox 140 is fixed by one or more bolts 148 (FIG. 2), or other means, to the lower cross bar 64 of the frame 60 of the head end 14 of the bed 10.

Two bushings 150 and 152 (FIG. 5) in the main body portion 144 of the housing 142 support a lower input shaft 160 for rotation relative to the housing. The bushing 152 is supported on a vertically extending internal wall 154 of the housing 142. The wall 154 is, for clarity, not shown in FIG. 6.

The lower input shaft 160 is rotatable about an axis 162 that is perpendicular to the drive axis 96. A lower gear assembly 164 is fixed on the lower input shaft 160 for rotation with the lower input shaft, at a location between the two bushings 150 and 152. The lower gear assembly 164 includes a spur gear 168 and a bevel gear 166.

The lower input shaft 160 has first and second opposite end portions 170 and 172. A pair of lower drive pins 174 project radially from the lower input shaft 160 at diametrically opposite locations on the first end portion 170. The lower drive pins 174 are fixed for rotation with the lower input shaft 160. A pair of second drive pins 176 project radially from the second end portion 172 of the lower input shaft 160. The second drive pins 176 are fixed for rotation with the lower input shaft 160.

Two bushings 180 and 182 in the main body portion 144 of the housing 142 support an upper input shaft 190 for rotation relative to the housing. The bushing 180, which is located above the bushing 152 of the lower input shaft 160, is supported on the internal wall 154. The upper input shaft 190 is rotatable about an axis 192 that is perpendicular to the drive axis 96 at a location above and parallel to the lower input shaft 160 and its axis 162. As a result, the upper input shaft 190 is located between the lower input shaft 160 and the output portion 146 of the gearbox housing 142.

An upper gear assembly 194 is fixed on the upper input shaft 190 for rotation with the upper input shaft, at a location between the two bushings 180 and 182. The upper gear assembly 194 includes a spur gear 196 and a bevel gear 198. The upper input shaft 190 has first and second opposite end portions 200 and 202. A pair of upper drive pins 204 project radially from the upper input shaft 190 at diametrically opposite locations on the first end portion 200. The upper drive pins 204 are fixed for rotation with the upper input shaft 190.

The upper gear assembly 194 on the upper input shaft 190 is in meshing engagement with the lower gear assembly 164 on the lower input shaft 160. Specifically, the spur gear 196 on the upper gear assembly 194 is in meshing engagement with the spur gear 168 of the lower gear assembly 164. As a result, rotation of the lower input shaft 160 in either direction about its axis 162 results in rotation of the upper input shaft 190 in the opposite direction of rotation about its own axis 192. Similarly, rotation of the upper input shaft 190 in either direction about its axis 192 results in rotation of the lower input shaft 160 in the opposite direction of rotation about its own axis 162.

The output portion 146 of the housing 142 supports an output gear assembly 208. The output gear assembly 208 includes an output bevel gear 210 that is in meshing engagement with the bevel gear 198 on the upper input shaft 190. The output bevel gear 210 is supported in the output portion 146 of the housing 142, by one or more bushings 212, for rotation about the drive axis 96. An upwardly opening mortise 214 is formed in the output bevel gear 210. The tenon 102 on the lower end portion 100 of the lead screw 92 extends into the mortise 214 in the output bevel gear 210. As a result, the output bevel gear 210 is fixed for rotation with the lead screw 92 about the drive axis 96. Therefore, rotation of either the lower input shaft 160 or the upper input shaft 190 results in rotation of the lead screw 92 about the drive axis 96.

The gearbox housing 142 has several access ports for the input shafts 160 and 190. The main body portion 144 of the gearbox housing 142 has a main access opening 220 adjacent the first end portions 200 and 170 of the upper and lower input shafts 190 and 160, respectively. The main access opening 220 faces the foot end 14*a* of the bed 10 when the bed is assembled, as shown in FIG. 1. A movable door or drive shaft cover 222 is pivotally connected to the gearbox housing 142. The cover 222 is movable between a first position as shown in solid lines in FIG. 5 and a second position as shown partially in dash-dot lines in FIG. 5. In the first position, the cover 222 covers the lower input shaft 160 and makes the upper input shaft 190 accessible from the exterior of the gearbox 140. In the second position, the cover 222 covers the upper input shaft 190 and makes the lower input shaft 160 accessible from the exterior of the gearbox 140.

The main body portion 144 of the gearbox housing 142 has a secondary access opening 224 adjacent the second end portion 172 of the lower input shaft 160. The secondary access opening 224 faces away from the foot end 14*a* of the bed 10 when the bed is assembled. A movable cover or cover 226 is pivotally connected to the gearbox housing 142. The cover 226 is movable between a first or closed position as shown in solid lines in FIG. 5 in which the cover covers the second end portion 172 of the lower input shaft 160, and a second or open position (not shown) in which the cover is opened and the lower input shaft 160 is accessible from the exterior of the gearbox 140.

The foot end 14*a* of the bed 10 (FIG. 1) is identical in construction to the head end 14. Corresponding parts of the foot end 14*a* are identified herein with reference numerals identical to those of the corresponding parts of the head end 14, but having the suffix "a" attached.

The foot end 14*a* of the bed 10 is interchangeable with the head end 14. When the bed 10 is assembled as in FIG. 1, the main access opening 220*a* of the gearbox 140*a* of the foot end 14*a* of the bed faces toward the main access opening 220 of the gearbox 140 of the head end 14 of the bed.

Because the head end 14 and the foot end 14*a* are identical, the main access opening 220*a* of the foot end gearbox 140*a* is at the same height off the floor 12 as the main access opening 220 of the head end gearbox 140. The lower input shaft 160*a* of the foot end gearbox 140*a* is at the same height off the floor 12 as the lower input shaft 160 of the head end gearbox 140. The upper input shaft 190*a* of the foot end gearbox 140*a* is at the same height off the floor 12 as the upper input shaft 190 of the head end gearbox 140.

The bed 10 includes a spring assembly 230 for supporting a mattress (not shown) on which the patient lies. The spring assembly shown includes a head spring 232, a foot spring 234, and a knee unit 236; other spring assemblies can be used. The several parts of the spring assembly 230 may be pivotable relative to each other and relative to the head end 14 and the foot end 14*a*, in a known manner. The spring assembly 230 is supported by brackets on the movable portions 22 and 22*a* of the head end 14 and the foot end 14*a*, respectively, in a known manner, for vertical movement with the movable portions of the head end and the foot end.

The foot spring 234 supports an electric motor shown schematically at 240 (FIG. 1). The electric motor 240 is actuatable in a known manner by one or more controls, such as a pendant (not shown), to raise or lower the spring assembly 230 in a manner described below.

The bed 10 includes a drive tube assembly 250 for transmitting rotary force from the electric motor 240 to the head end 14 of the bed, and from the electric motor 240 to the foot end 14*a* of the bed. The drive tube assembly 250 includes a first drive tube section 252. The first drive tube section 252 extends between and interconnects the motor 240 and the head end 14 of the bed 10. The drive tube assembly 250 also includes a second drive tube section 254. The second drive tube section 254 extends between and interconnects the motor 240 and the foot end 14*a* of the bed 10.

The first drive tube section 252 is connected with the motor 240 in a known manner so that the first drive tube section is rotatable in a first direction of rotation, relative to both the head end 14 of the bed and the foot end 14*a* of the bed, upon "raising" actuation of the motor. The first drive tube section 252 is rotatable in a second direction of rotation opposite the first direction, upon "lowering" actuation of the motor 240.

The second drive tube section 254 is connected with the motor 240 in a known manner so that the second drive tube section is rotatable in the same first direction of rotation upon "raising" actuation of the motor, and rotatable in the same second direction of rotation opposite the first direction, upon "lowering" actuation of the motor. Thus, the first drive tube section 252 and the second drive tube section 254 are coupled for rotation with each other in the same direction of rotation, relative to the head end 14 and the foot end 14*a* of the bed 10, upon actuation of the electric motor 240.

A typical position for the parts of the bed 10 is shown schematically in FIG. 1. The first drive tube section 252 extends from the electric motor 240 to the upper input shaft 190 of the gearbox 140 on the head end 14 of the bed 10, as shown in dash-dot lines in FIG. 5. The drive pins 204 on the upper input shaft 190 of the gearbox 140 of the head end 14 couple the upper input shaft for rotation with the first drive tube section 252.

The second drive tube section 254 extends from the electric motor 240 to the lower input shaft 160*a* (not shown) of the gearbox 140*a* on the foot end 14*a* of the bed 10. The drive pins 174*a* (not shown) on the upper input shaft 160*a* of the gearbox 140*a* of the foot end 14*a* couple the lower input shaft 160*a* for rotation with the second drive tube section 254.

As a result, the connection between the drive tube assembly 250 and the head end 14 of the bed 10 is at a different vertical height off the floor 12 than the connection between the drive tube assembly and the foot end 14*a* of the bed, even though the two gearboxes 140 and 140*a* are each, as a whole, at the same vertical height off the floor.

Upon actuation of the motor 240 in a direction of rotation so as to raise the bed 10, the drive tube assembly 250 rotates in a first direction of rotation relative to the head end 14 and the foot end 14*a* of the bed. The first drive tube section 252 and the second drive tube section 254 both rotate in the first direction of rotation. The first direction of rotation is generally perpendicular to the axes of rotation 96 and 96*a* of the lead screws 92 and 92*a*, respectively.

Figure 6:
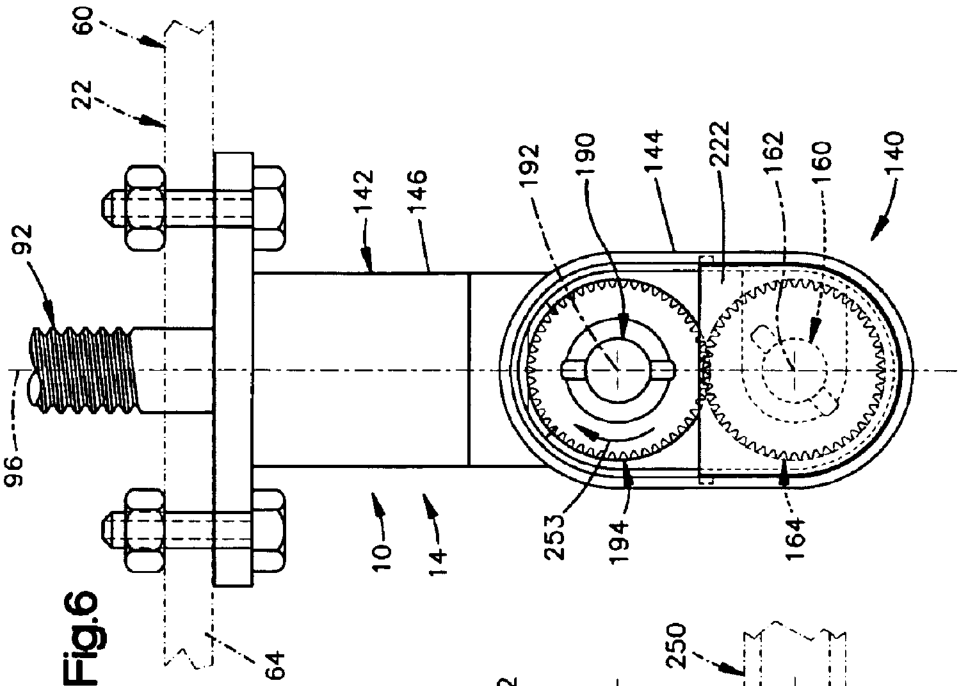
FIG. 6 is an elevational view of the gearbox of FIG. 5.
Figure 5:
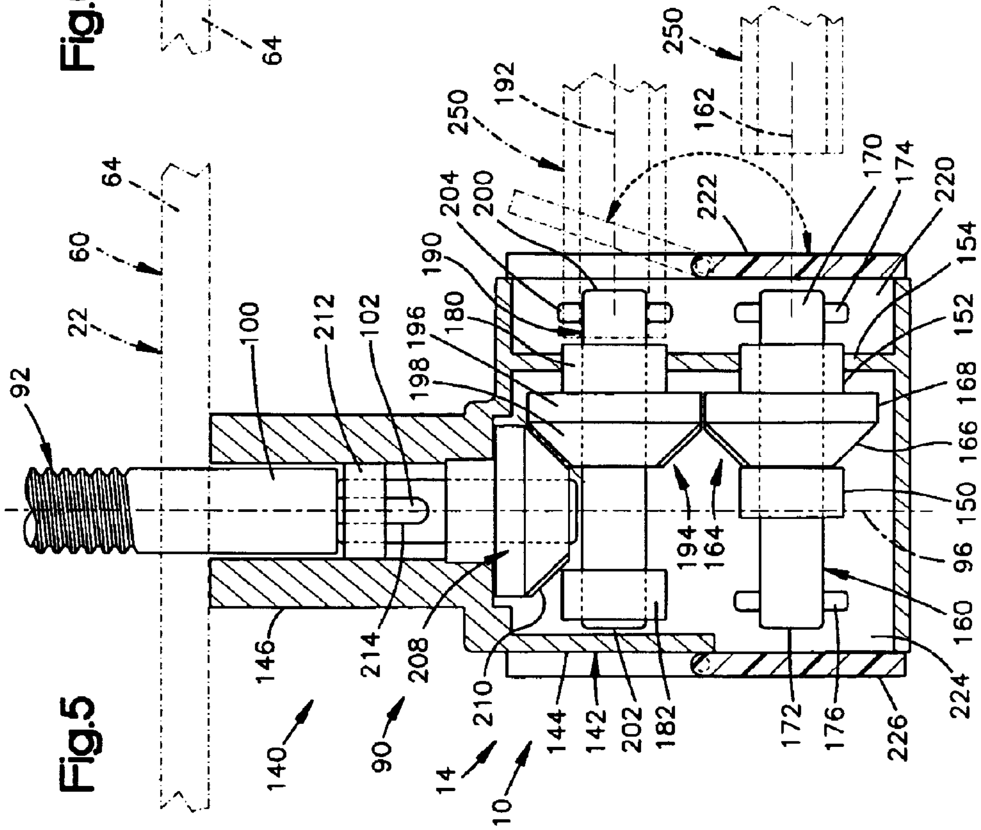
FIG. 5 is a sectional view of one embodiment of a gearbox that forms part of the bed end of FIG. 2.

The first drive tube section 252, which is coupled for rotation with the upper input shaft 190 of the gearbox 140 of the head end 14, causes the upper input shaft to rotate in the first direction of rotation, for example, clockwise as viewed in FIG. 6 as indicated by the arrow 253. The rotation of the upper input shaft 190 is transmitted through the upper bevel gear 198 (FIG. 5) into the output shaft 208 and thence into the lead screw 92 of the head end 14 of the bed 10.

The lead screw 92 rotates about the drive axis 96. The rotation of the lead screw 92 constitutes rotation relative to the slip nut 110. Because the lead screw 92 and the slip nut 110 are threadedly engaged, this relative rotation produces relative axial movement between the lead screw and the slip nut.

The relative axial movement between the lead screw 92 and the slip nut 110 is produced because the slip nut does not rotate on the lead screw. The slip nut 110 does not rotate because of the pressure plates 124 of the nut assembly 104. Specifically, the pressure plates 124 are mounted non-rotatably about the axis 96 in the nut housing 106. The radially inwardly directed force exerted by the pressure plate springs 128, urging the pressure plates 124 against the slip nut halves 112 and 114, is normally strong enough so that the abutting engagement of the pressure plates and the slip nut halves couples the slip nut to the pressure plates and thus prevents the slip nut from rotating on the lead screw 92. When the lead screw 92 is driven to rotate about its axis 96, therefore, the rotational force transmitted from the lead screw to the slip nut is not great enough to overcome this holding force exerted by the pressure plates 124 on the slip nut, and the slip nut does not rotate with the lead screw. Instead, the slip nut 110 translates along the screw 92 (or vice versa), producing relative axial movement between the nut housing 106 and the screw.

The relative axial movement that results is movement of the lead screw 92 and not the nut 110, for the following reasons. The slip nut 110 is mounted in the nut housing 106, which is fixed to the cross-beam 28 of the fixed portion 20 of the head end 14 of the bed 10. The fixed portion 20 of the bed 10 rests on the floor 12, supporting the movable portion 22 of the head end 14 off the floor. As a result, force tending to produce relative axial movement between the slip nut housing 104 and the lead screw 92 tends to cause the movable portion 22 of the head end 14, including the lead screw 92, to move axially in space relative to the floor 12 as it rotates about the drive axis.

Because the lead screw 92 is fixed in position vertically on the frame 60, the vertical movement of the lead screw 92 drives the entire movable portion 22 of the head end 14 vertically upward, relative to the fixed portion 20 of the head end. The frame 60 of the head end 14, and the gearbox 140, move vertically with the lead screw 96 relative to the floor 12.

The structure of the fixed portion 20 of the head end 14 is advantageous as follows. Axially directed force from the slip nut housing 106 is transmitted directly into the rigid cross-beam 28, to which the slip nut housing is fixed. This force is transmitted directly into the inner legs 24 and 26, to which the cross-beam 28 is rigidly fixed. As a result, no cables or pulleys, such as those shown in the aforementioned U.S. Pat. No. 5,134,731, are needed in the head end 14 of the bed 10.

The slip nut assembly 104 is operative to limit upward and downward travel of the movable portion 22 of the head end 14 of the bed 10, in a manner similar to that described in U.S. Pat. No. 5,134,731 discussed above. Specifically, when the lead screw 92 reaches its end of downward travel relative to the slip nut 110, the radially extending pin 98 (FIG. 3) on the rotating screw contacts the axially projecting pin 116 on the slip nut 110. This engagement couples the slip nut 110 for rotation with the lead screw 92, overcoming the holding force of pressure plates 124. As the slip nut 110 rotates thereafter, it rotates within the pressure plates 124 and thus within the slip nut housing 104. Because the slip nut 110 is rotating with the lead screw 92, it is no longer translating along the lead screw, and the slip nut no longer transmits axial force from the lead screw to the nut housing 106. This eliminates further relative vertical movement between the lead screw 92 and the slip nut 110, and the movable portion 22 of the head end 14 ceases vertical movement relative to the fixed portion 20 of the head end.

The above-described construction of the slip nut 100 is advantageous as follows. Because the slip nut 100 can be cast or molded, no costly machining process is needed. In addition, the axially projecting pins 116 and 118 can be formed as one piece with the remainder of the slip nut 110, simplifying the manufacturing process. Because the two slip nut halves 112 and 114 are identical, only one mold is needed. Also, when the slip nut 110 rotates at its end of travel as described above, the parting line between the two slip nut halves 112 and 114 makes an audible clicking noise that can signal the user of the bed of the end of travel condition.

Figure 7:
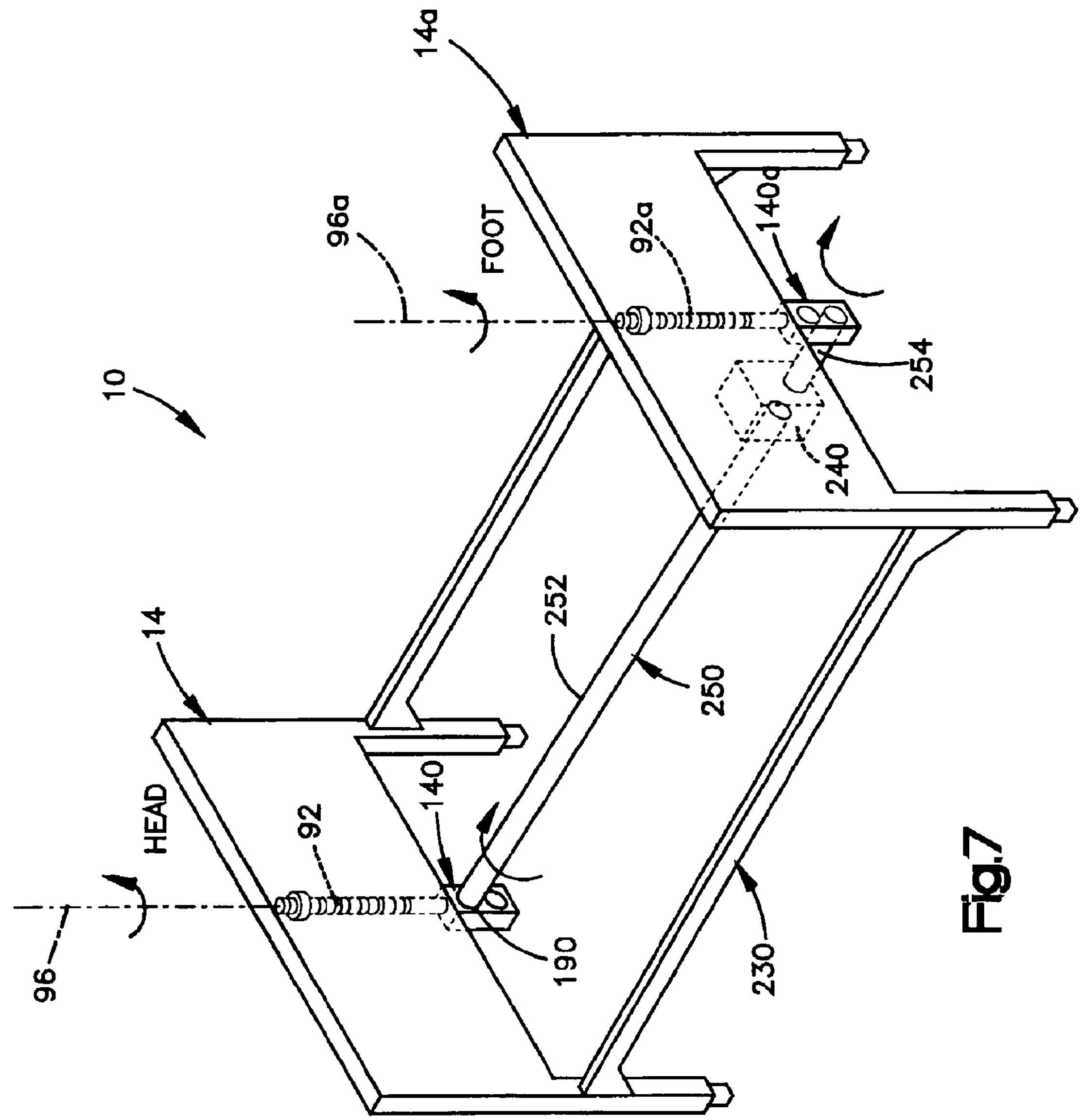
FIG. 7 is a schematic perspective view of the bed of FIG. 1.

At the same time that the first drive tube section 252 is driving the lead screw 92 of the head end 14 to move the head end upward, the second drive tube section 254 is driving the lead screw 92*a* of the foot end 14*a* of the bed 10 to move the foot end upward. FIG. 7 is a schematic perspective view of parts of the bed 10 that illustrates the directions of movement of the parts. The second drive tube section 254 is coupled (not shown) to the lower input shaft 160*a* of the gearbox 140*a* of the foot end 14*a*. Upon actuation of the motor 240 to raise the head end 14 of the bed 10 as described above, the second drive tube section 254 rotates in the same first direction of rotation in space relative to the head end 14 and the foot end 14*a* of the bed.

The rotation of the second drive tube section 254 causes the lower input shaft 160*a* of the foot end 14 to rotate in the first direction of rotation, which is counter-clockwise if looking at the great box 140*a* as viewed in FIG. 6 because the foot end 14*a* faces the opposite direction from the head end 14. This rotation of the lower input shaft 160*a* is transmitted through the bevel gears 164*a* and 194*a* into the upper input shaft 190*a*, causing the upper input shaft 190*a* to rotate in the opposite direction, that is, a clockwise direction as viewed in FIG. 6. This rotation of the upper input shaft 190*a* is transmitted into the output shaft 208*a* and thence into the lead screw 92*a* of the foot end 14*a* of the bed 10.

The lead screw 92*a* of the foot end 14*a* of the bed 10 rotates about its drive axis 96*a* within the foot end of the bed.

This screw rotation within the foot end 14*a* is in the same direction in space as the direction of rotation of the lead screw 92 within the head end 14 of the bed 10. As a result, the rotation of the lead screw 92*a* of the foot end 14*a* causes the movable portion 22*a* of the foot end of the bed 10 to move vertically relative to the floor 12 in the same direction as the head end 14 is moving.

Thus, both ends 14 and 14*a* of the bed 10 move vertically in the same direction—upward or downward as viewed in FIGS. 6 and 7—because the drive tube assembly 250 is connected with different input points in the two gearboxes 140 and 140*a*. This simultaneous movement occurs even though the first drive tube section 252 and the second drive tube section 254 are rotating in the same direction relative to the other parts of the assembled bed 10. This result is achieved in the bed 10 by coupling the second drive tube section 254 with the lower input shaft 160*a* of the gearbox 140*a* of the foot end 14*a* whenever the first drive tube section 252 is coupled with the upper input shaft 190 of the gearbox 140 of the head end 14 of the bed 10 (or vice versa).

When the movable portion 22 of the head end 14 of the bed 10 and the movable portion 22*a* of the foot end 14*a* of the bed move vertically, the bed spring assembly 230 moves vertically also, relative to the floor 12, as desired. This has the effect of raising or lowering a patient who is lying on the bed spring assembly 230.

It can thus be seen that, in the bed 10 illustrated in FIGS. 1–7, the bed end 14 is interchangeable with the bed end 14*a*, thus making the bed ends "universal". As a result, when parts of a bed 10 are selected from a warehouse for delivery to a home customer, any two bed ends 14 can be selected; there is no need to pick a "head end" and a distinct "foot end". This can eliminate trips back to the warehouse if an incorrect selection is made and discovered at the time of setting up the bed 10 in the home. In addition, this "universal" quality of the bed end 14 can make it unnecessary to manufacture two different bed ends for use in the bed 10.

Figure 8:
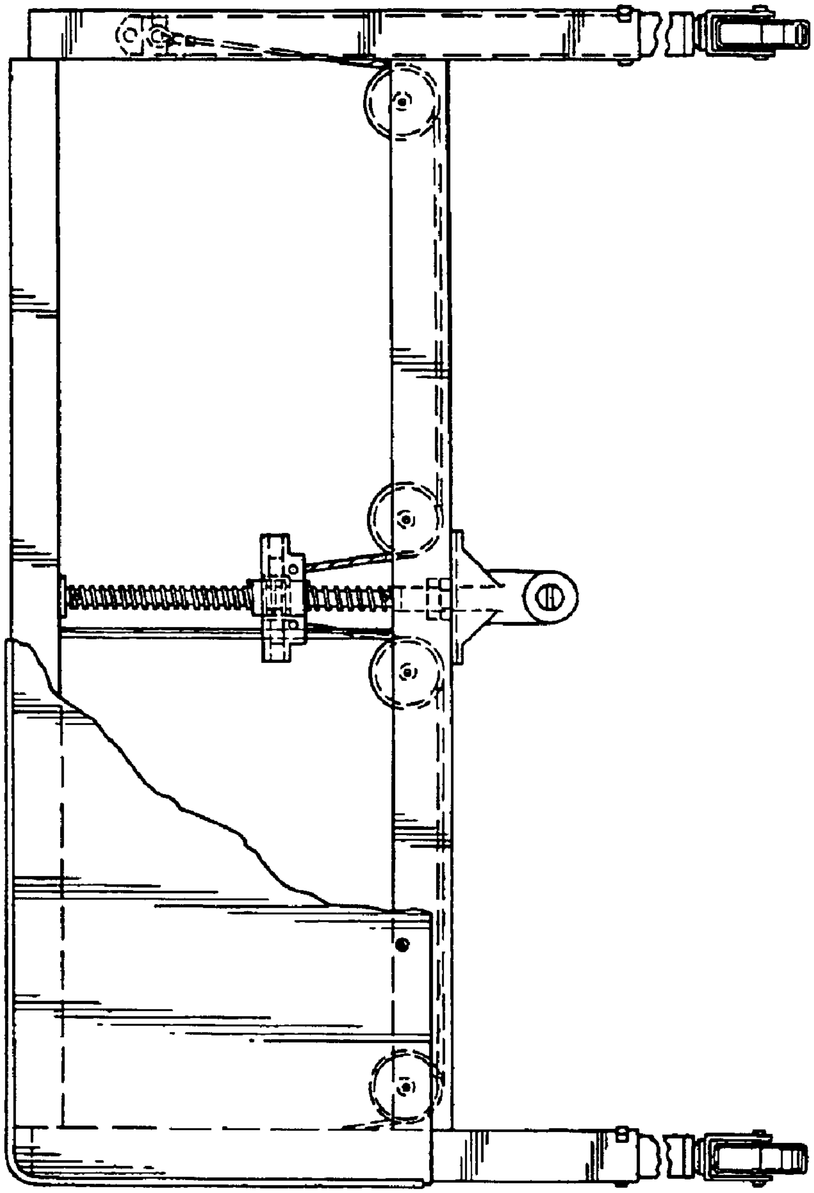
Fig.8 Prior Art
FIG. 8 is a view of a prior art bed end.

The bed end 10 described above incorporates an elevating mechanism including the cross-beam 28 that is rigidly tied between the inner legs 24 and 26. The cross-beam 28 receives force from the lead screw 92 via the slip nut 110 and the slip nut housing 104, and transmits that force to the inner legs 24 and 26. It should be understood that other types of elevating mechanisms could be used. For example, FIG. 8 illustrates a prior art bed end shown in U.S. Pat. No. 5,134,731. The bed end shown in FIG. 8 includes an elevating mechanism that uses pulleys and cables to transmit force between the slip nut housing and the inner legs of the bed end. This is one type of alternative elevating mechanism that is usable in a universal bed end 14 as described above.

Figure 10:
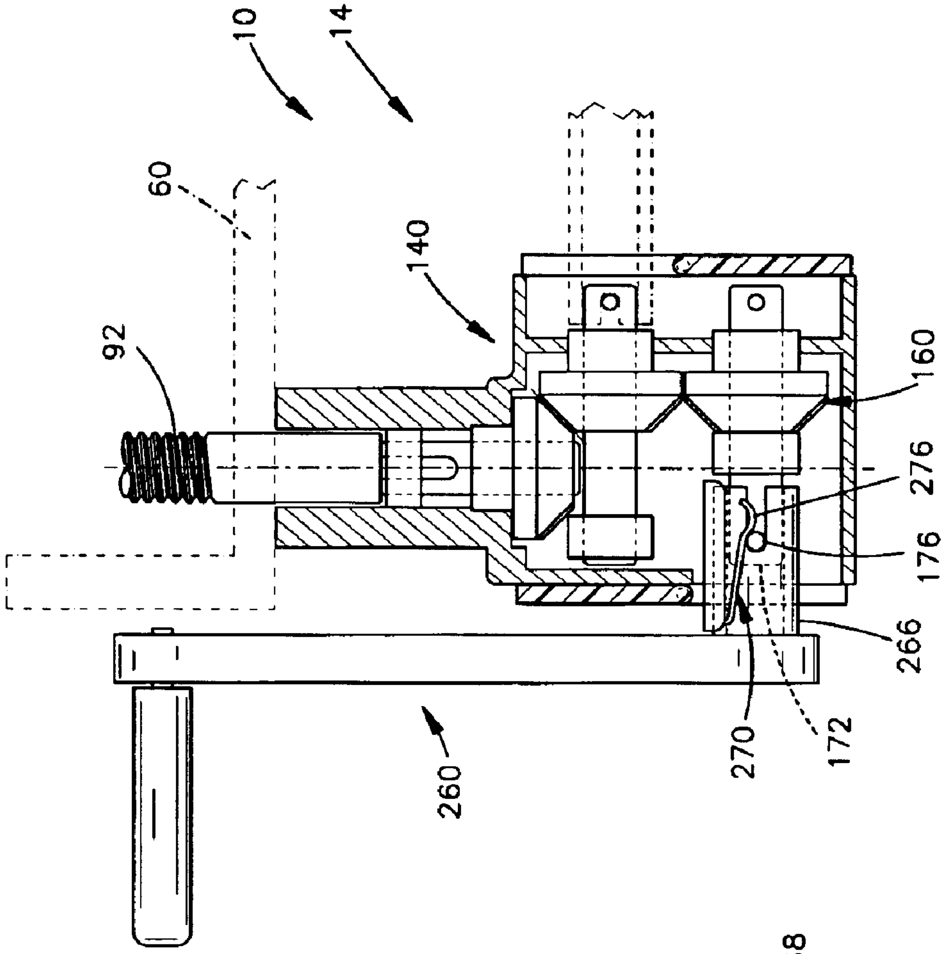
FIG. 10 is a view similar to FIG. 5 showing the crank of FIG. 9 attached to a gearbox.
Figure 9:
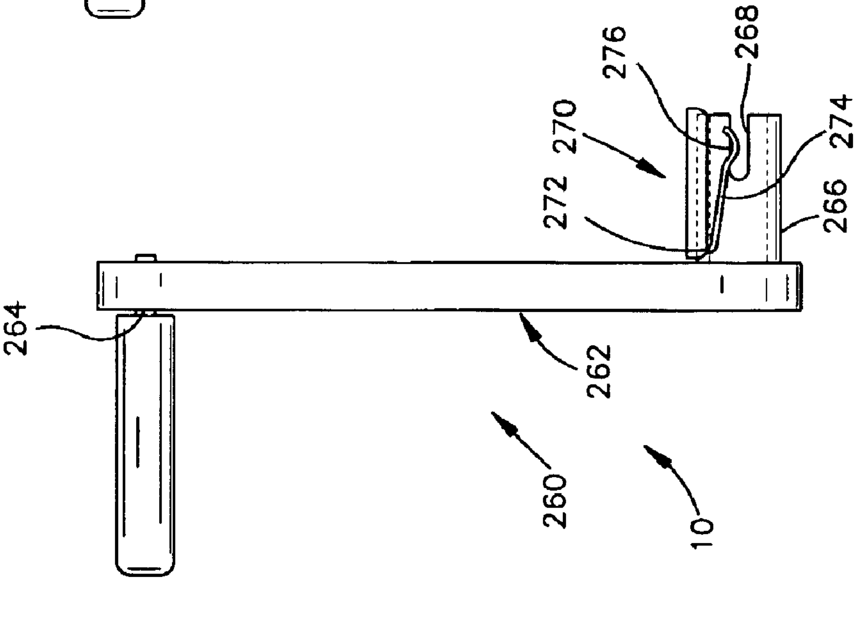
FIG. 9 is an elevational view of one embodiment of a crank that is usable with the bed end of FIG. 2.

FIGS. 9 and 10 illustrate a gearbox hi/lo crank 260 for use in the head end 14 of the bed 10. Prior art home articulating bed designs that are semi electric beds (manual hi/lo) have a die cast primary crank with a folding handle. The crank is permanently fixed to the gearbox. Because the crank has to be located at the foot end of the bed (projecting out into the room from the outer major side surface of the foot end), then by default the bed end that has the crank must be used as the foot end; the head end and the foot end are not interchangeable.

Some beds also include an emergency crank that is a simple wire-form crank for emergency use only. This has one end adapted to engage the articulation motors and the other end adapted to engage the hi/lo gearbox. By virtue of its light weight construction this crank is not suitable for extended use.

The crank 260 (FIGS. 9 and 10) of the present invention includes a two-part handle 262 that is hinged at 264 to reduce its size when installed. A slotted tube 266 projects from the handle 262. The tube 266 has a cylindrical configuration adapted to fit over the second end portion 172 of the lower input shaft 160 of the gearbox 140 when the cover is pivoted upward, as shown in FIG. 10. A pair of diametrically opposed slots 268 in the tube 266 fit over the drive pins 176 on the second end portion 172 of the lower input shaft 160. The tube 266 is made from steel and is strong enough together with the other parts of the crank 260 to raise or lower the bed 10 repeatedly over the lifetime of the bed end 14 without deformation.

The crank 260 also includes a detent member 270. In the illustrated embodiment, the detent member 270 is a U-shaped wire spring having a base portion 272 crimped onto the tube 266. Two resilient leg portions 274 of the wire spring 270 project from the base portion 272. Each one of the leg portions 274 has a bent end portion 276 adapted to engage (fit behind) one of the drive pins 176 on the lower input shaft 160.

To assemble the crank 260 to the gearbox 140, the user places the tube 266 of the crank over the second end portion 172 of the lower input shaft 160. The slots 268 in the tube 266 are fitted over the drive pins 176. As the tube 266 is slid axially over the input shaft 160, the bent end portions 276 of the legs 274 of the wire spring 270 engage the drive pins 176 and are cammed away from the drive pins to allow the tube to slide fully onto the input shaft.

When the drive pins 176 reach the ends of the slots 268, the wire spring legs 274 resiliently move back into their starting position. In this position, the drive pins 176 engage the bent end portions 276 of the wire spring legs 274. This engagement resists removal of the tube 266 from the input shaft 160, without a strong pull. Thus, the crank 260 is fixedly but not permanently attached to the gearbox 140 and may be used with the gearbox for so long as the bed 10 is assembled in that location. When the bed 10 is to be disassembled, the crank 260 can be removed by the dealer.

The crank 260 is strong enough to be used as an everyday crank for hi/lo purposes, or for emergency (power failure) operations. Nevertheless, the crank 260 is removable from the input shaft 160 by the dealer so that it can be placed on either bed end 14 or 14*a* during assembly of the bed 10. Because the crank 260 is removable from the bed end 14 and usable on another bed end 14, this helps to make the bed ends 14 and 14*a* universal—that is, interchangeable at either end of the bed 10, in comparison to a bed end having a permanently affixed crank.

Figure 11:
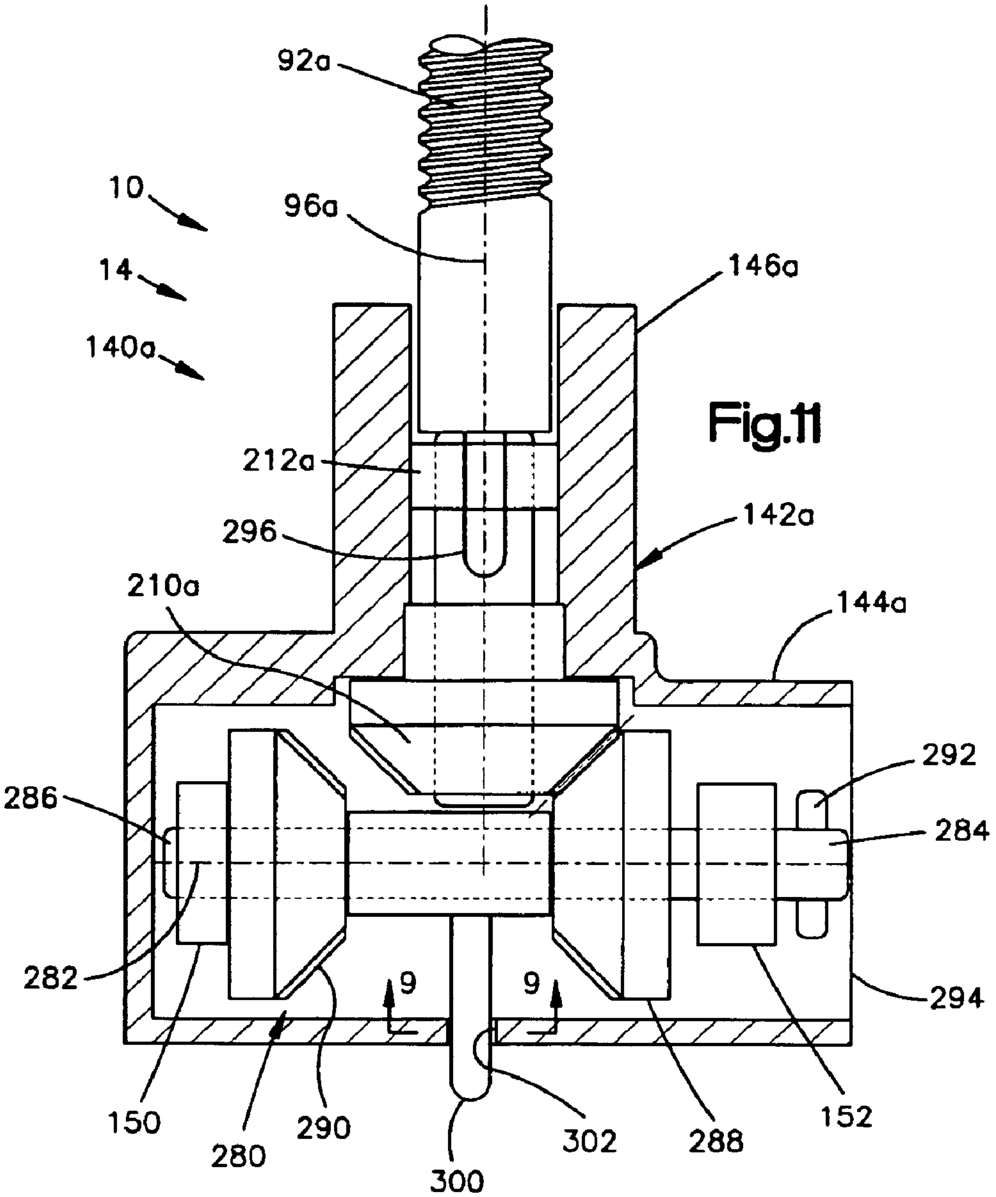
FIG. 11 is a sectional view of an alternative gearbox embodiment that can be part of the bed end of FIG. 2.
Figure 12:
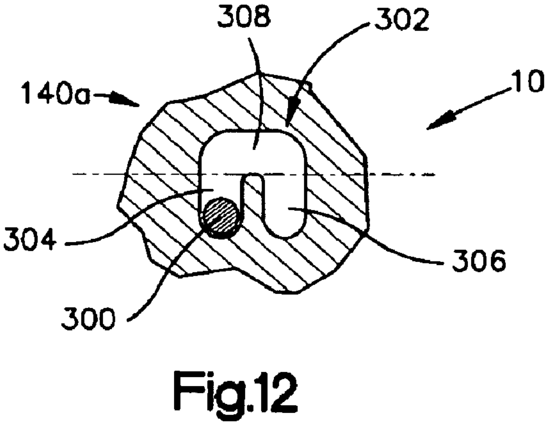
FIG. 12 is a sectional view of a portion of the gearbox of FIG. 11.

FIGS. 11 and 12 illustrate an alternative gearbox 140*a* for use in the head end 14 or foot end 14*a* of the bed 10. The gearbox 140*a* is similar to the gearbox 140 (FIGS. 1–6), and parts that are the same or similar are given the same reference numerals with the suffix "a" added.

The gearbox 140*a* includes a housing 142*a*. The housing 142*a* has a main body portion 144*a* and an outlet portion 146*a* that projects upward from the main body portion. The gearbox 140*a* is mounted on the frame, in a manner not shown, so that the drive axis 96*a* extends vertically into the outlet portion 146*a* of the housing 142*a*.

Two bushings 150*a* and 152*a* in the main body portion 144*a* of the housing 142*a* support a single input shaft 280 for rotation relative to the housing. The input shaft 280 is rotatable about an axis 282 that is perpendicular to the drive axis 96*a*.

The input shaft 280 has first and second opposite end portions 284 and 286. A first gear assembly 288 is fixed on the input shaft 280 for rotation with the input shaft, adjacent the first end portion 284 of the input shaft. A second gear assembly 290 is fixed on the input shaft 280 for rotation with the input shaft, adjacent the second end portion 286 of the input shaft. The second gear assembly 290 is spaced apart from the first gear assembly 288.

A pair of drive pins 292 project radially from the input shaft 280 at diametrically opposite locations on the first end portion 284. The drive pins 292 are fixed for rotation with the input shaft 280. The gearbox housing 142*a* has a single access opening 294 adjacent the first end portion 284 of the input shaft 280. The access opening 294 is not covered by a cover.

The output portion 144*a* of the housing 140*a* supports an output bevel gear 210*a* that is located between the first and second gear assemblies 288 and 290 on the input shaft 280. The output bevel gear 210*a* is supported in the output portion 144*a* of the housing 140*a,* by one or more bushings 212*a,* for rotation about the drive axis 96*a*. The output bevel gear 210*a* has a mortise and tenon connection 296 to the lead screw 92*a,* as described above with reference to FIG. 5. As a result, the lead screw 92*a* is fixed for rotation with the output bevel gear 210*a* about the drive axis 96*a*.

The input shaft 280 is supported by the bushings 150*a* and 152*a,* for sliding movement relative to the housing 142*a* in a direction parallel to the axis of rotation 282 of the drive shaft. The input shaft 280 includes a locator pin 300 (FIGS. 11 and 12) that projects radially from a location between the first and second gear assemblies 288 and 290. The locator pin 300 is received in a U-shaped slot 302 in the housing. The slot 302 has first and second end portions 304 and 306 and a central portion 308.

When the locator pin 300 is in the first end portion 304 of the slot 302, as shown in FIGS. 11 and 12, the first gear assembly 288 on the input shaft 280 is in meshing engagement with the output bevel gear 210*a*. As a result, rotation of the input shaft 280 in a first direction about the axis 282 results in rotation of the output bevel gear 210*a,* and the lead screw 92*a,* in a first direction of rotation about the drive axis 96*a*.

When the locator pin 300 is in the second end portion 306 of the slot 302, the input shaft 280 is moved axially from the position shown in FIG. 11, and the second gear assembly 290 on the input shaft is in meshing engagement with the output bevel gear 210*a*. Therefore, rotation of the input shaft 280 in the first direction about the axis 282 results in rotation of the output bevel gear 210*a,* and the lead screw 92*a,* in a second or opposite direction of rotation about the drive axis 96*a*.

As a result, the bed end 14 to which the gearbox 140*a* is attached can be used at either end of the bed 10, and still provides simultaneous upward or downward movement of both bed ends, simply by moving the input shaft 280 from one position to the other. Therefore, a bed 10, having two identical bed ends 14 with gearboxes 140*a* of the type shown in FIGS. 11 and 12, can use the two bed ends interchangeably simply by adjusting the gearbox as described above.

Figure 13:
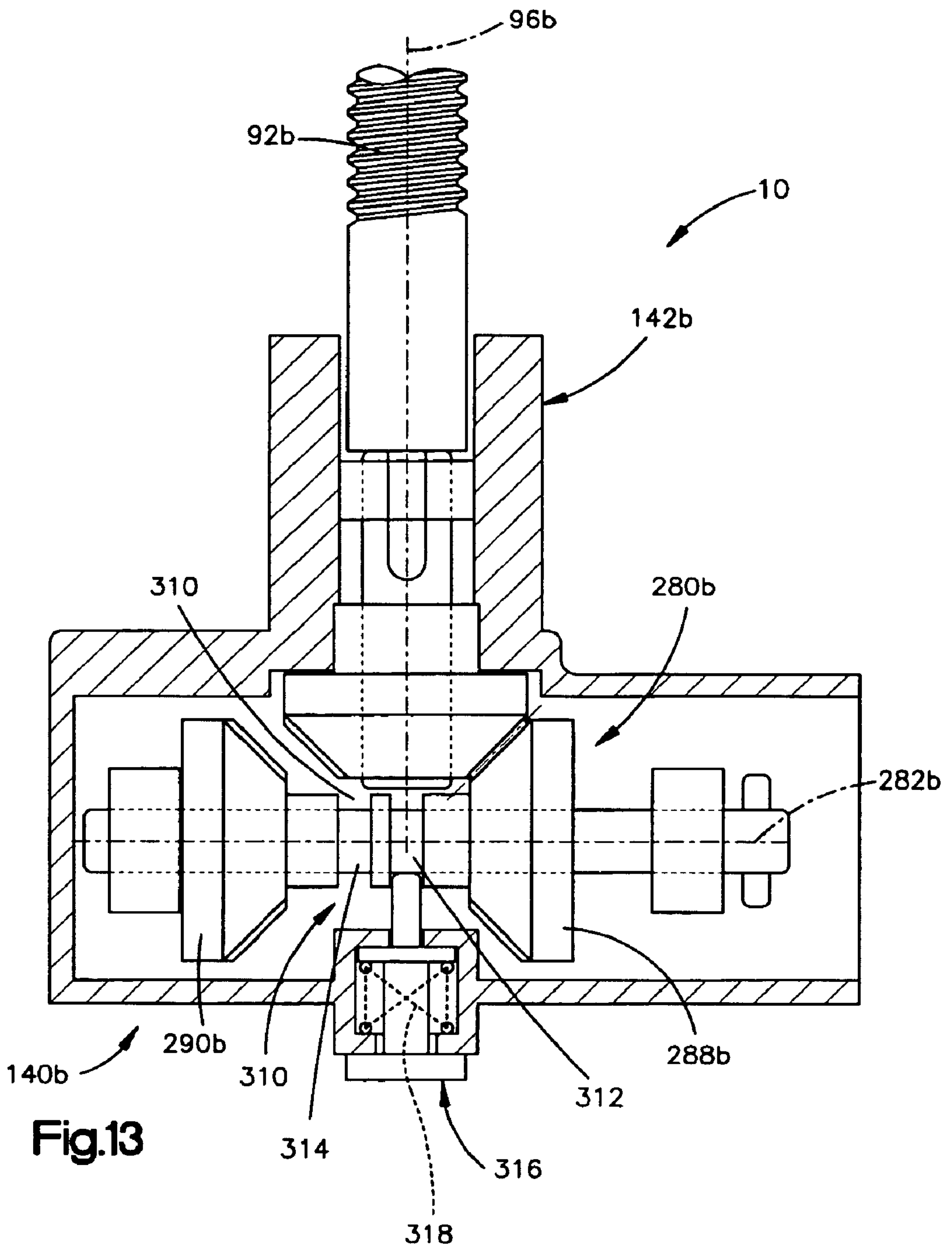
FIG. 13 is a sectional view of another alternative gearbox embodiment that can be part of the bed end of FIG. 2.
Figure 14:
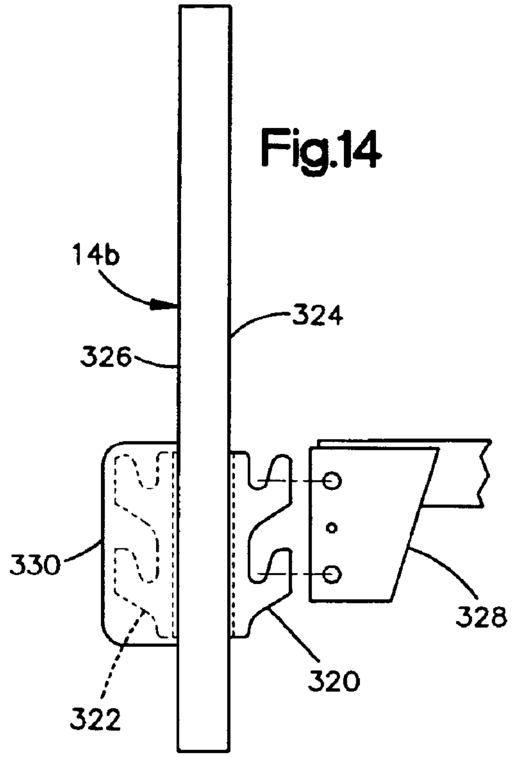
FIGS. 14–17 are views of alternative corner plates one embodiment of that can be used with the bed end of FIG. 2.

FIG. 13 illustrates another alternative gearbox 140*b* for use in the head end or foot end of the bed 10. The gearbox 140*b* is similar in construction and operation to the gearbox 140*a* (FIGS. 11 and 12). Parts of the gearbox 140*b* that are the same as or similar to corresponding parts of the gearbox 140*a* are given the same reference numerals with the suffix "b" attached.

The gearbox 140*b* (FIG. 13) includes an input shaft 280*b* that is supported for sliding movement relative to the housing 142*b* in a direction parallel to the axis of rotation of the input shaft. Disposed between the two gear assemblies 288*b* and 290*b* on the input shaft 280*b* is a control portion 310 of the input shaft. The control portion 310 includes two circumferential grooves 312 and 314 spaced axially from each other. The gearbox 310 also includes a locator pin 316. The locator pin 316 is supported on the housing 142*b* for in-and-out (radial) sliding movement relative to the housing and to the input shaft 280*b*.

When the locator pin 316 is in the first groove 312 on the input shaft 280*b,* as shown in FIG. 13, the first gear assembly 288*b* on the input shaft 280*b* is in meshing engagement with the output bevel gear 210*b*. As a result, rotation of the input shaft 280*b* in a first direction about the axis 282*b* results in rotation of the output bevel gear 210*b,* and the lead screw 92*b,* in a first direction of rotation about the drive axis 96*b*.

The locator pin 316 can be pulled out of the first groove 312 against the bias of a spring 318 to enable the input shaft 280*b* to be moved axially until the second groove 314 is located radially inward of the locator pin. The locator pin 316 can then be released and the spring 318 will hold it in the second groove 314. In this position, the second gear assembly 290*b* on the input shaft 280*b* is in meshing engagement with the output bevel gear 210*b*. Therefore, rotation of the input shaft 280*b* in the first direction about the axis 282*b* results in rotation of the output bevel gear 210*b,* and the lead screw 92*b,* in a second or opposite direction of rotation about the drive axis 96*b*.

As a result, the bed end 14 to which the gearbox 140*b* is attached can be used at either end of the bed 10, and still provide simultaneous upward or downward movement at both bed ends 14 and 14*a,* simply by moving the input shaft 280*b* axially from one position to the other. Therefore, a bed 10, having two identical bed ends with gearboxes 140*b* of the type shown in FIG. 13, can use the two bed ends interchangeably simply by adjusting the gearbox as described above.

FIGS. 14–17 illustrate some alternative corner plate (bracket) designs for use in the head end 14 or foot end 14*a* of the bed 10. The corner plates shown in FIGS. 14–17 can be used with other bed ends, and, specifically, with other bed ends that do not have one of the gearbox designs 140, 140*a* or 140*b,* or the elevating mechanism described above. The corner plates are designed to enable a bed end to which the corner plates are attached, to be reversed front to back and still function to support a spring assembly of the bed. This feature makes the bed ends more easily used at either end of the bed 10.

The corner plates are shown with bed ends 14*b,* 14*c,* and 14*d* that are similar in construction and operation to the bed end 14. The bed end 14*b* (FIG. 14) includes first and second corner plates 320 and 322 that are mirror images of each other and that extend from first and second opposite major side surfaces 324 and 326 of the bed end 14*b*.

When the bed end 14*b* is assembled in a bed 10 so that the first corner plate 320 is to be used (for example with a frame rail or a spring assembly shown partially at 328), the first corner plate 320 is uncovered. A wall protector 330 is placed over the unused second corner plate 322. As a result, the first corner plate 320 is available for use, and the second corner plate 322 is protected and covered to prevent contact with the wall if the bed end 14*b* is placed with the second corner plate facing the wall.

When the bed end 14*b* is assembled in a bed 10 so that the second corner plate 322 is to be used, the second corner plate is uncovered (not shown). The wall protector 330 is placed over the unused first corner plate 320. As a result, the second corner plate 322 is available for use, and the first corner plate 320 is protected from contact with the wall.

In this manner, the bed end 14*b* can be assembled in a bed 10 so that either the first major side surface 324 or the second major side surface 326 of the bed end faces the other parts of the assembled bed 10, and a corner plate 320 and 322 will be available to support the spring assembly or frame rails 328 of the bed.

The bed end 14*c* (FIG. 15) includes a corner plate assembly 332 including first and second corner plates 334 and 336 that are mirror images of each other and that are extendible from first and second opposite major side surfaces 338 and 340 of the bed end. The corner plate assembly 332 includes a central portion 342 that is fixed by rivets 356, or in another manner, to a side surface 348 of the bed end 14*c*.

The first corner plate 334 is hinged to the central portion 342. The first corner plate 334 is pivotally movable between a first position in which it projects from the first major side surface 38 of the bed end 14*c* as shown in FIG. 15, and a second position (not shown) in which the first corner plate lies flat against the first major side surface.

The second corner plate 336 is also hinged to the central portion 342. The second corner plate 336 is pivotally movable between a first position in which it projects from the second major side surface 340 of the bed end 14*c* as shown in FIG. 15, and a second position (not shown) in which the second corner plate lies flat against the second major side surface.

Figure 15:
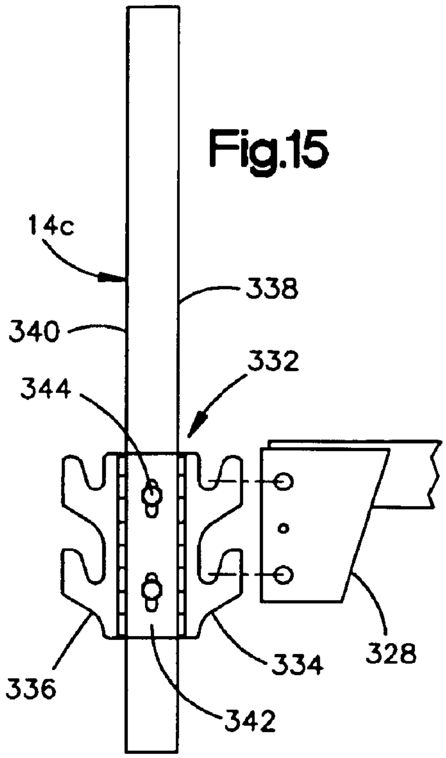

When the bed end 14*c* is to be assembled in a bed 10 with the first major side surface 338 facing the opposite end of the bed, the first corner plate 334 is swung into the operative position shown in FIG. 15. The frame rail or spring assembly shown partially at 328 is attached to the first corner plate 334. When this is done, the second corner plate 336 can be laid flat against the second major side surface 340 of the bed end 14*c,* out of the way.

When the bed end 14*c* is to be assembled in a bed 10 with the second major side surface 340 facing the opposite end of the bed, the second corner plate 336 is swung into the operative position shown in FIG. 15. A frame rail or spring assembly such as shown partially at 328 is attached to the second corner plate 336. When this is done, the first corner plate 334 can be laid flat against the first major side surface 338 of the bed end 14*c,* out of the way.

In this manner, the bed end 14*c* can be assembled in a bed 10 so that either the first major side surface 338 or the second major side surface 340 of the bed end faces the other parts of the assembled bed, and a corner plate 334 or 336 will be available to support the spring assembly or frame rails 328 of the bed.

The bed end 14*d* (FIG. 16) includes a single corner plate 350 that is movable between first and second opposite major side surfaces 352 and 354 of the bed end 14*d.* The bed end has two support pins 356 for supporting the corner plate 350. The support pins 356 project from the side 358 of the bed end 14*d.*

The bed end 14*d* also has a lock member indicated schematically at 360. The lock member 360 may be a pin, for example, that is movable vertically on the bed end 14*d* along a slot 362. The corner plate 350 has two notches 364 for receiving the support pins 356 on the bed end 14*d.*

Figure 16:
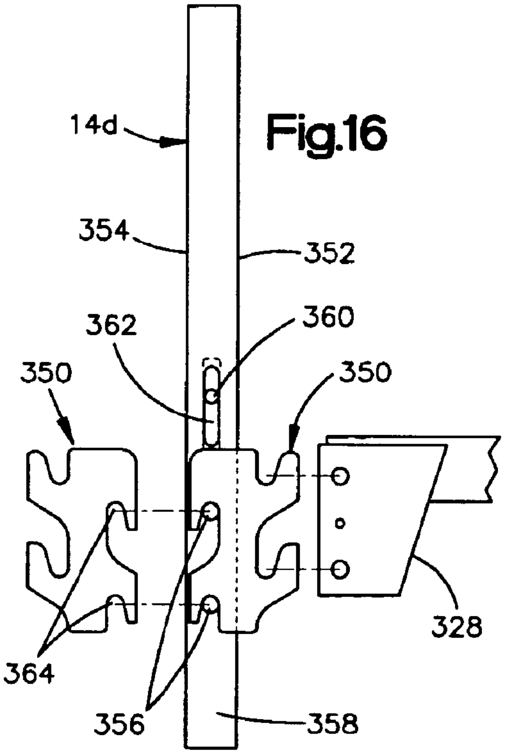

When the bed end 14*d* is assembled in a bed 10 so that the corner plate 350 is to be used projecting from the first major side surface 352 of the bed end (for example with a frame rail or a spring assembly shown partially at 328), the corner plate 350 is assembled as shown attached in FIG. 16 with the pins 356 received in the notches 364. The lock member 360 is moved into a locking position against the corner plate 350 to hold the corner plate in position on the bed end 14*d.*

When the bed end 14*d* is assembled in a bed 10 so that the corner plate 350 is to be used projecting from the second major side surface 354 of the bed end, the corner plate is removed and switched to the other side of the bed end, as shown to the left in FIG. 16. The corner plate 350 is hooked onto the support pins 356, and the locking mechanism 360 is used to hold the corner plate in that position on the bed end 14*d.*

In this manner, the bed end 14*d* can be assembled in a bed 10 so that either the first major side surface 352 or the second major side surface 354 of the bed end faces the other parts of the assembled bed, and a corner plate 350 will be available to support the spring assembly or frame rails 328 of the bed.

Figure 17:
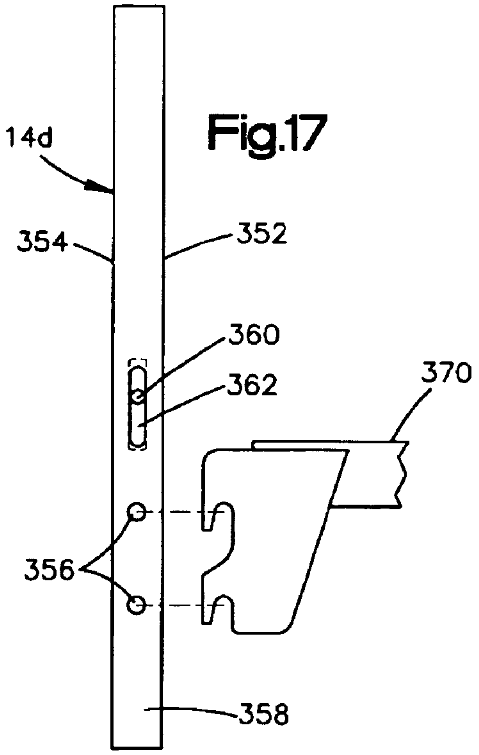

FIG. 17 illustrates the use of the bed end 14*d* with a spring assembly or frame rail 370 that has notches for receiving the support pins 356 on the bed end. In this case, a separate corner plate, such as the corner plate 350, is not needed. The support pins 356 function as the reversible corner plate. The spring assembly or frame rail 370 is supportable from either major side surface 352 or 354 of the bed end 14*d.*

The parts of the bed end 14 shown in FIGS. 1–6 are structural and operational parts for controlling at least one operational aspect of the bed, specifically, elevation of the bed. A bed end 14 in accordance with the present invention also includes a bed end cover for enclosing and covering the operational and structural parts. Several alternative covers are shown, in FIGS. 18–22.

The preferred material for these bed end covers is an engineered plastic. The selected material should be washable without being affected by water or solvents and without absorbing moisture. The selected material should also be scratch resistant, impact resistant, and ultraviolet resistant. Also, the material should be able to be molded or extruded with a single color throughout. Suitable materials include but are not limited to HDPE, ABS, and PVC.

The materials typically used for prior art decorative/covering panels in home care adjustable beds are paper or fiberboard covered in vinyl laminate. This material can scratch completely through the laminate, absorbs moisture when washed, does not have high impact resistance, and is not ultraviolet resistant. In addition, such a cover is manufactured by dropping the various panels of the cover into a fixture, then screwing or gluing them together. This is a time and labor-intensive operation.

An engineered plastic bed end cover is easier to handle, because it is impact and scratch resistant. It is also quicker to assemble in the plant. It is also washable when returned from home use to the dealer, for use by another patient, as is required. It is cost effective to manufacture, more durable, and stronger. In addition, the use of molded plastic for the bed end cover allows for color variations and therefore more artistic quality to the bed end, as well as different physical profiles or configurations for the bed end.

Figure 2:
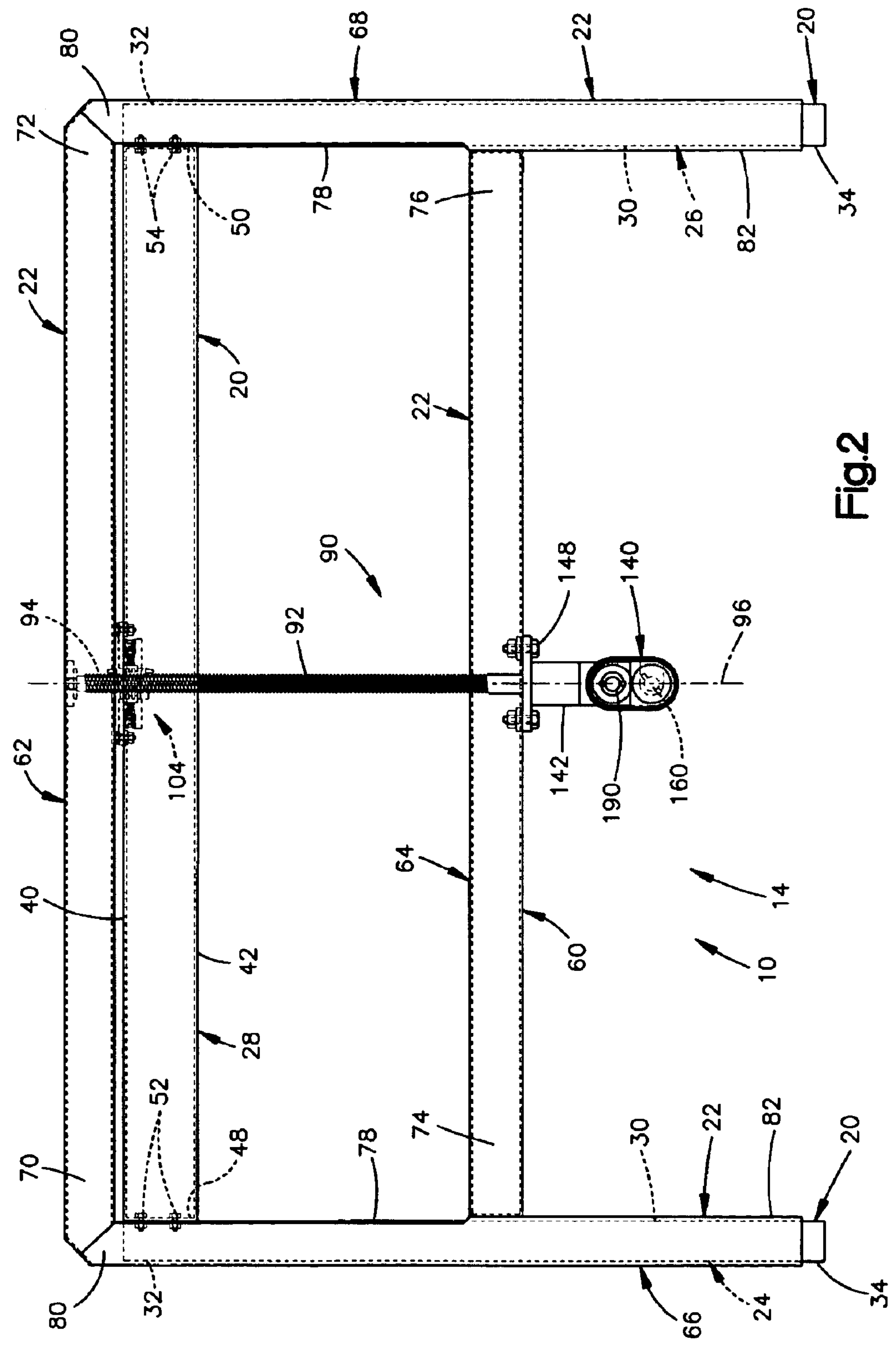
FIG. 2 is a schematic elevational view of one embodiment of a bed end that forms part of the bed of FIG. 1.

The cover 400 (FIGS. 18 and 19) is one example of a plastic bed end cover that is constructed in accordance with the present invention. The cover 400 is a hollow cover for enclosing and covering the operational and structural assembly shown in FIG. 2. This cover 400 is extremely easy to assemble to the structural and operational parts of the bed end 14 as shown in FIG. 2, for example. It is also easy to manufacture and handle.

The cover 400 is a one-piece plastic cover having an interior major side panel 402 that faces inward toward the opposite end of the bed 10 when assembled, and an opposite exterior major side panel 404. The cover 400 is preferably made by blow molding. A preferred material is HDPE (high density polyethylene).

The cover 400 also has an upper edge portion 406 interconnecting the interior and exterior major side panel, panels 402 and 404. First and second opposite side edge portions 408 and 410 of the cover 400 interconnect the interior and exterior major side panels 402 and 404 adjacent the first and second legs (shown in phantom in FIG. 18) of the bed end. The cover 400 further has a lower edge portion 412 extending between the first and second opposite side edge portions 408 and 410. The cover 400 has an open bottom edge 414 for enabling sliding movement of the hollow cover over the operational and structural assembly in a direction between the upper edge portion 406 and the lower edge portion 412 of the cover (as indicated by the arrow 416).

Figure 18:
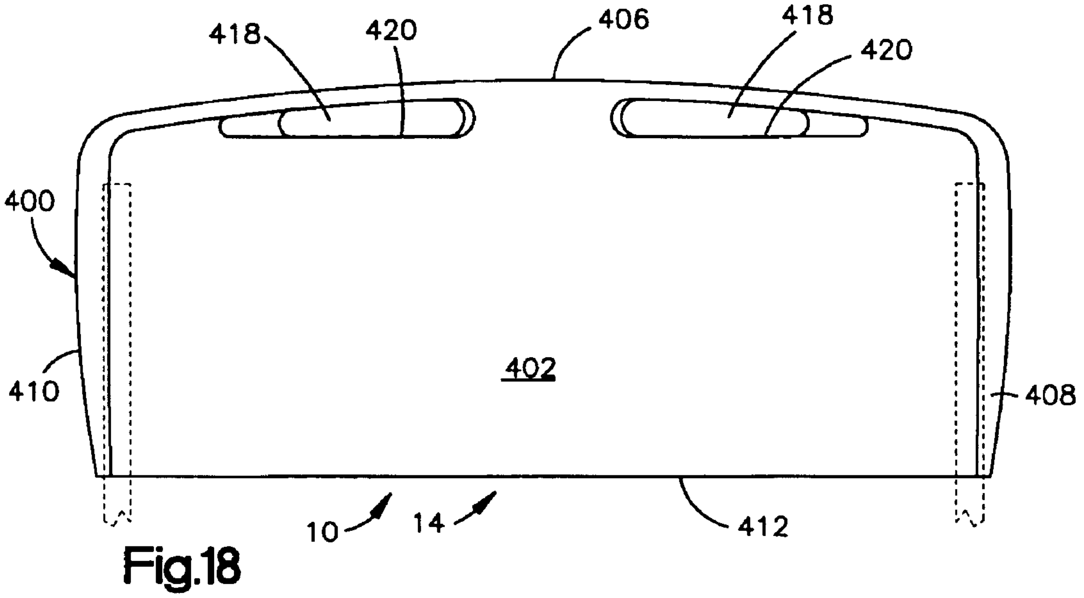
FIG. 18 is an elevational view of one embodiment of a plastic bed end cover in accordance with the present invention.
Figure 19:
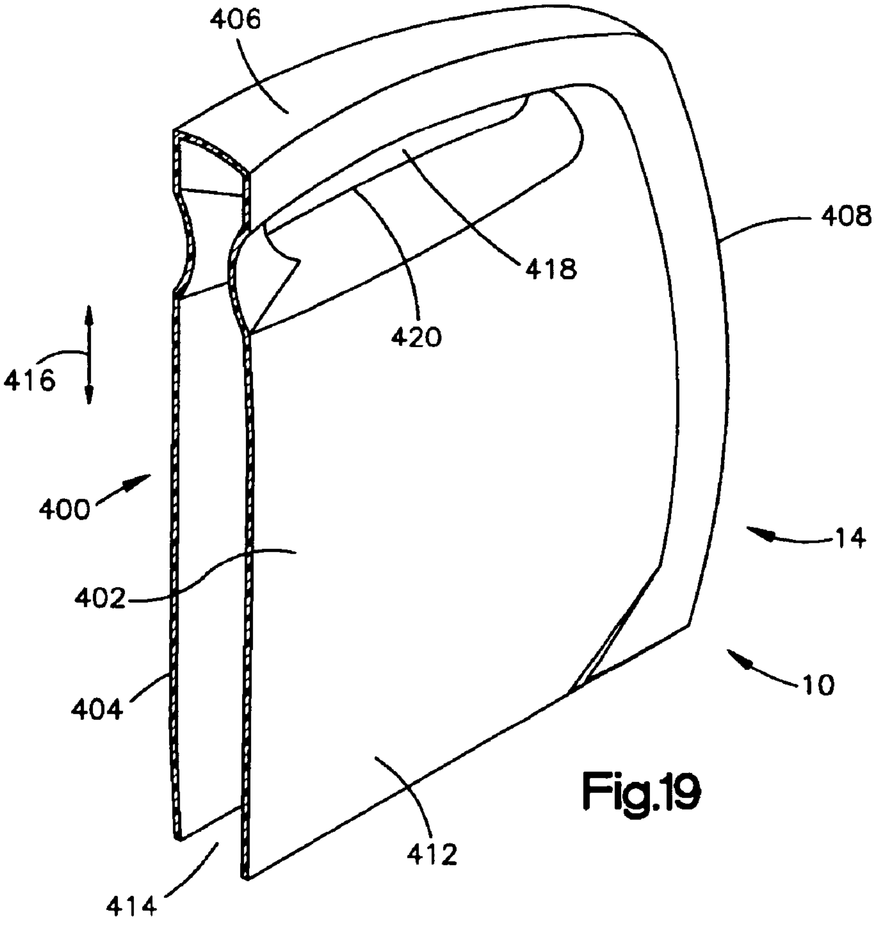
FIG. 19 is a cutaway sectional view of the bed end cover of FIG. 18.
Figure 20:
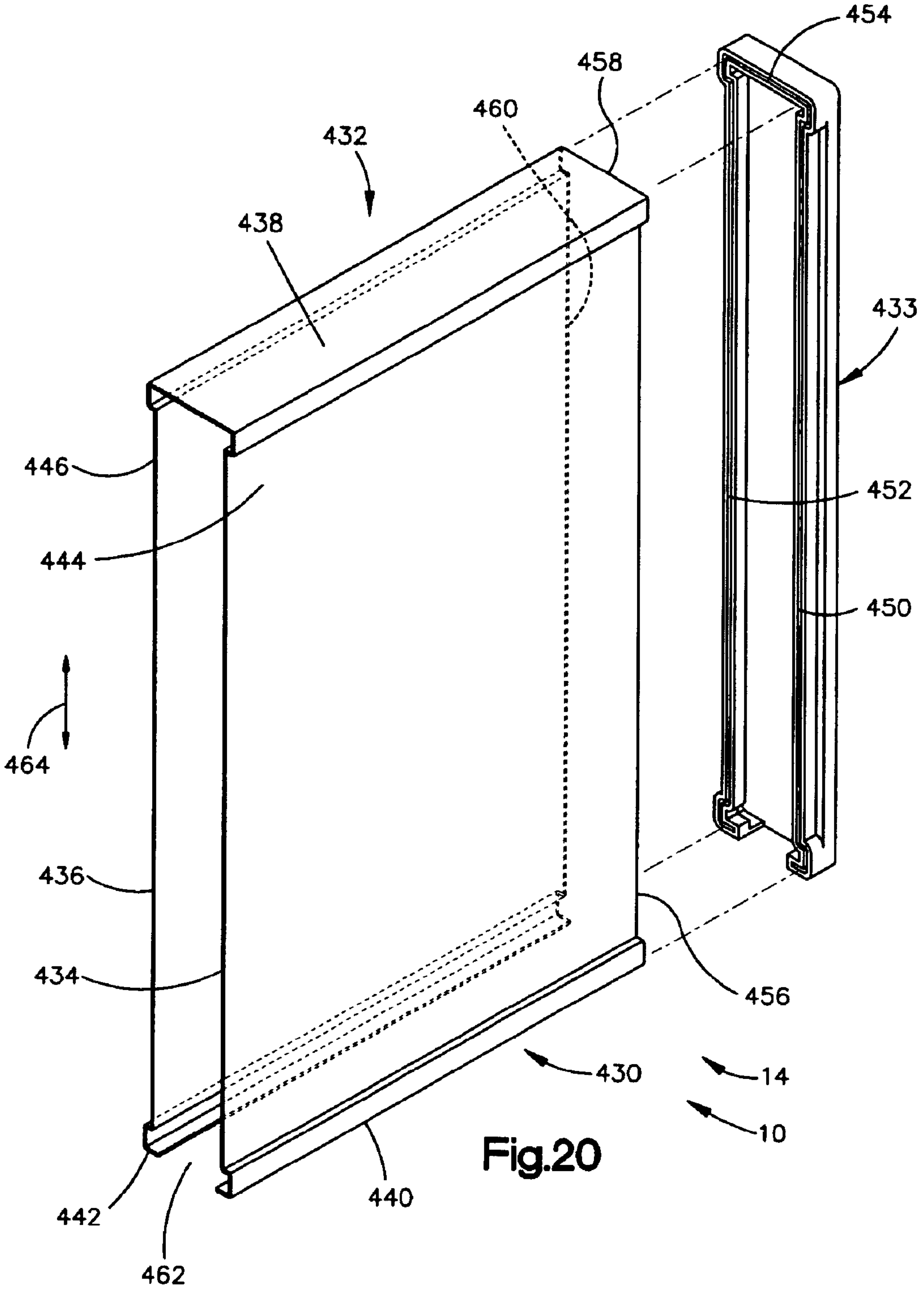
FIG. 20 is an exploded view of an alternative plastic bed end cover embodiment in accordance with the present invention.
Figure 21:
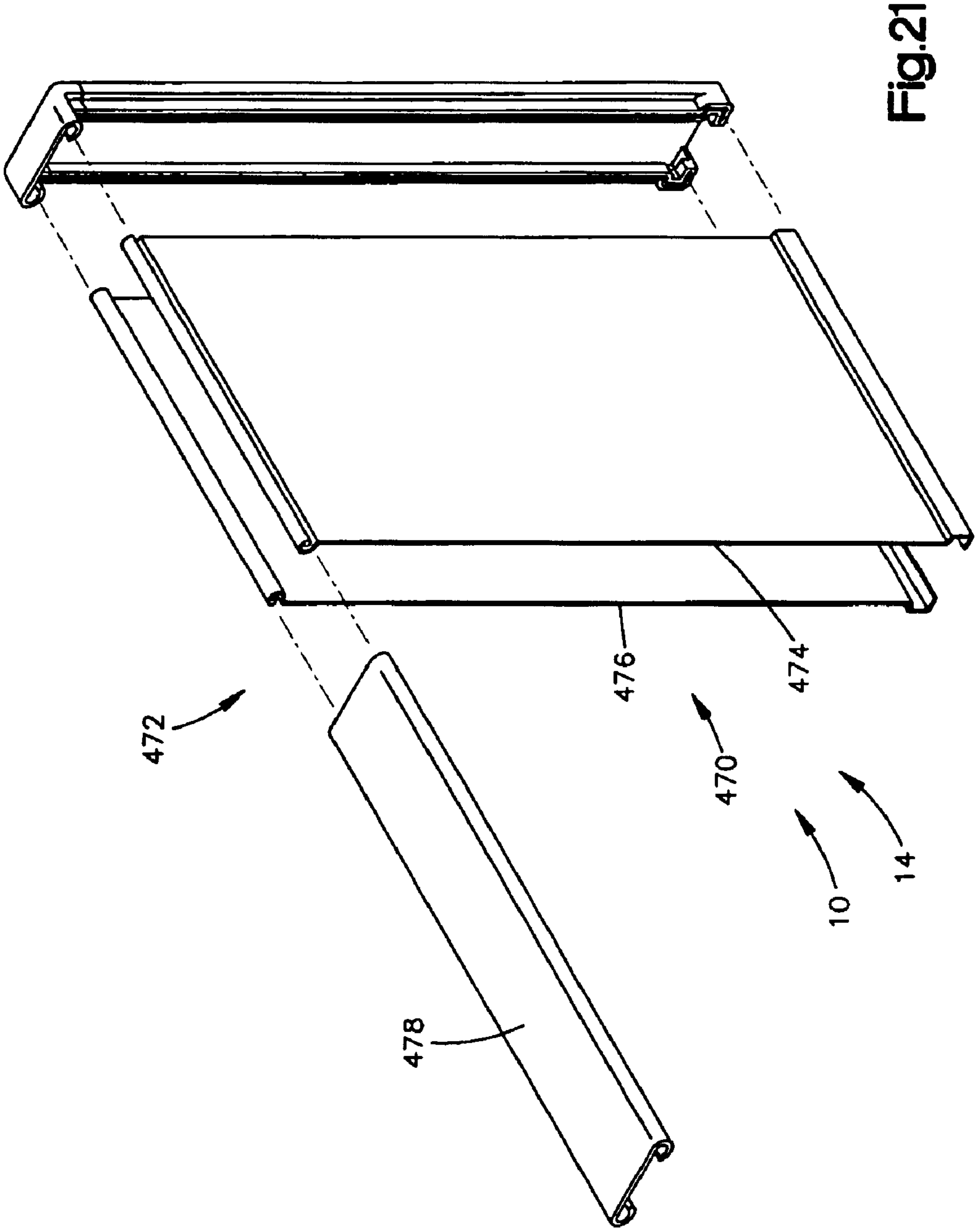
FIG. 21 is an exploded view of another alternative plastic bed end cover embodiment in accordance with the present invention.
Figure 22:
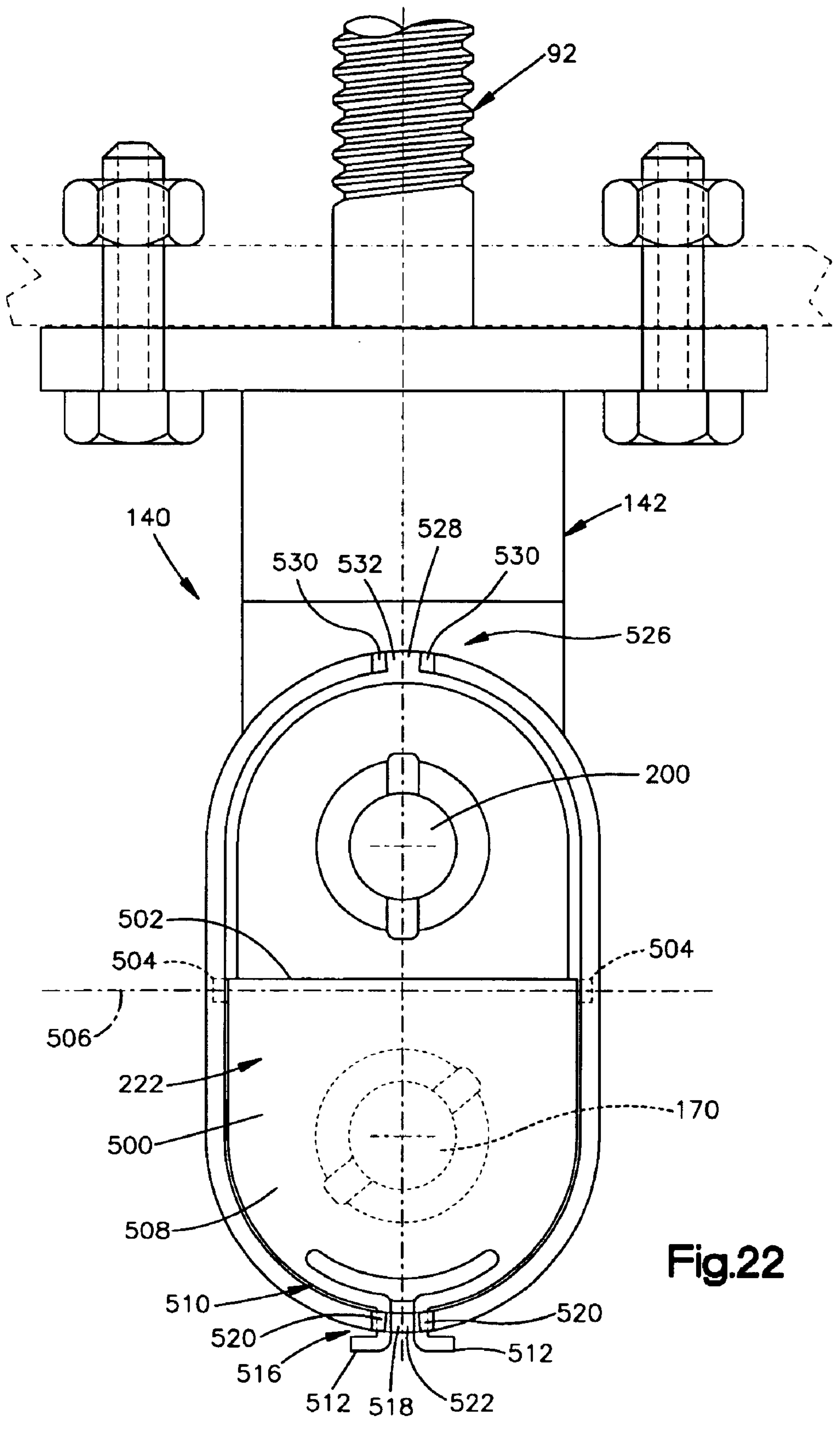
FIG. 22 is a front elevational view of a gearbox including a movable cover in accordance with a feature of the invention, the cover being shown in one closed position.
Figure 25:
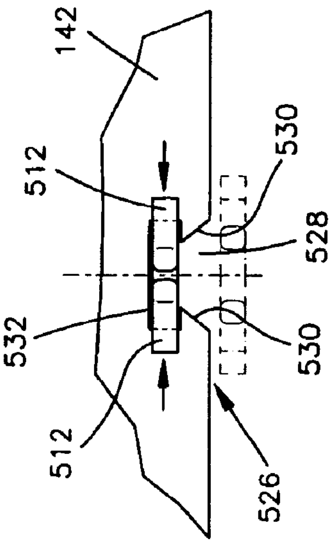
FIG. 25 is a top plan view of a portion of the gearbox and cover.
Figure 26:
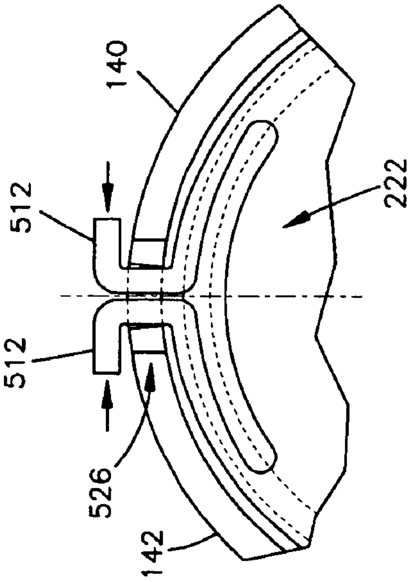
FIG. 26 is an enlarged front elevational view of a portion of the gearbox and cover.

The cover 400 illustrated in FIGS. 18 and 19 has two optional openings 418 extending through the bed end cover between the interior major side panel 402 and the exterior major side panel 404. The two openings 418 are disposed adjacent the upper edge portion 406 of the cover 400. Each one of the two openings 418 has a lower edge 420 that extends parallel to the lower edge portion 412 of the cover 400. As a result, a supporting assembly, such as a trapeze (not shown), can be clamped onto the bed end 14 between the lower edge 420 of one of the openings 418, and the lower edge portion 412 of the cover 400.

The cover 430 (FIG. 20) is another example of a plastic bed end cover that is constructed in accordance with the present invention. The cover 430 is a hollow cover for enclosing and covering the operational and structural assembly or parts of a bed end. The cover 430 has a three-piece plastic construction including a central panel 432 and two identical end caps 433 (only one of which is shown).

The central panel 432 is a one-piece extrusion preferably made from PVC. The central panel 432 includes an interior major side panel 434 that faces the opposite end of the bed 10 when assembled, and an opposite exterior major side panel 436. The panels 434 and 436 are joined by an upper edge panel 438 in an upside-down U-shaped configuration to form the central panel 432.

The interior major side panel 434 has a planar configuration with a rectangular rib 440 forming a bottom end portion of the panel. Similarly, the exterior major side panel 436 has a planar configuration with a rectangular rib 442 forming a bottom end portion of the panel. The upper edge panel 438 forms a similar rectangular configuration with the top edge portions 444 and 446 of the interior and exterior major side panels 434 and 436, respectively.

The end caps 433 may be made from ABS. The end cap 433 has a generally planar configuration. The end cap 433 has three flanges 450, 452 and 454 that matingly engage three edges, 456 of the central panel 432, to secure the end cap to the central panel. The end cap 433 has a more rigid construction than the central panel 432, and, as a result, can help to rigidify the assembled cover 430.

The cover 430 has an open bottom edge 462 for enabling sliding movement of the hollow cover over the operational and structural assembly in a direction between the upper edge panel 438 and the bottom edge of the cover, as indicated by the arrow 464.

This cover 430 is therefore easy to assemble to the structural and operational parts of the bed end 14 as shown in FIG. 2, for example. It is also easy to manufacture and handle, and has the other advantages discussed above with reference to the embodiment of FIGS. 18 and 19.

The cover 470 (FIG. 20) is a third example of a plastic bed end cover that is constructed in accordance with the present invention. The cover 470 is a hollow cover for enclosing and covering the operational and structural assembly.

The cover 470 is similar to the cover 430 (FIG. 20) with the exception that the central panel 472 in the cover 430 is made from three pieces, not one. Specifically, the central panel 470 is formed as an interior major side panel 474, an exterior major side panel 476, and an upper edge panel 478. The three panels 474–478 when joined together to form the central panel 472 have an upside-down U-shaped configuration. The cover 470 otherwise has the all advantages and feature described above with respect to the cover 430 (FIG. 20).

As noted above, the movable door or drive shaft cover 222 (shown generally in FIGS. 5 and 6) is pivotally movable relative to the main access opening 220 and thus relative to the upper and lower input shafts 190 and 160, respectively. When the gearbox is actuated, both input shafts 190 and 160 rotate about their respective axes, even though only one of them is active. It is desirable to cover the unused input shaft to prevent contact with the rotating parts, for example by a hand or a finger. In its first position as shown in solid lines in FIGS. 5 and 6, the cover 222 covers the lower input shaft 160 and makes the upper input shaft 190 accessible from the exterior of the gearbox 140. Covering the lower input shaft 160 prevents contact by a user with the rotating lower input shaft when it is not being used. In its second position, the cover 222 covers the upper input shaft 190 and makes the lower input shaft 160 accessible from the exterior of the gearbox 140. Covering the upper input shaft 190 prevents contact by a user with the rotating upper input shaft when it is not being used.

Figure 24:
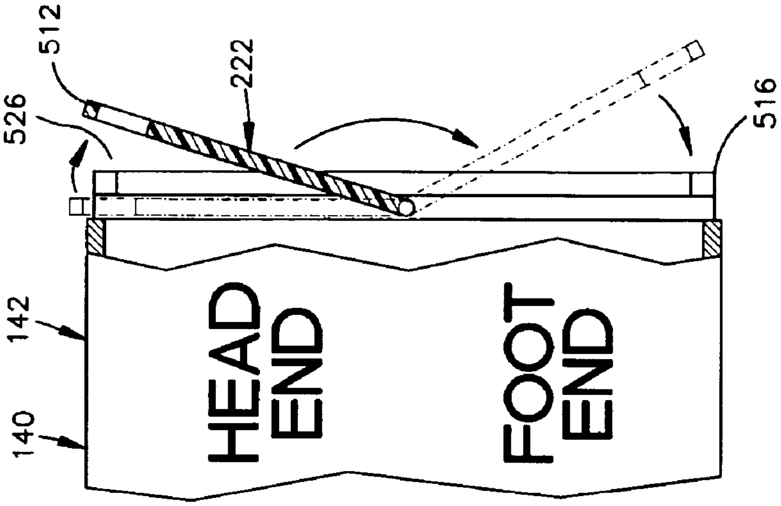
FIG. 24 is a schematic side elevational view of a portion of the gearbox including the cover.
Figure 23:
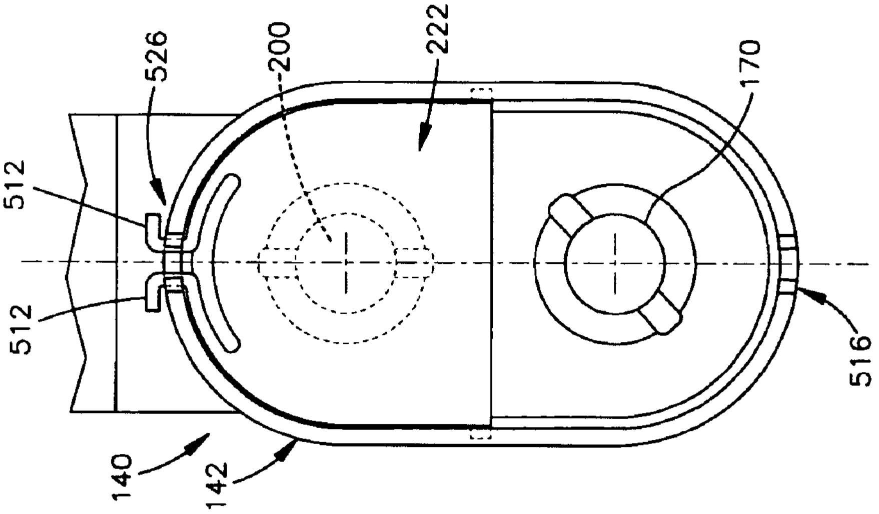
FIG. 23 is a view similar to FIG. 22 showing the cover in a second closed position.

The drive shaft cover 222, its attachment to the gearbox housing 142, and its operation, are shown in more detail in FIGS. 22–26. The cover 222 has a generally semicircular or semi-oval configuration. The cover has a main body portion 500 with a wider end 502 that is formed with two pivot pins 504 that are retained in the gearbox housing 142. The pivot pins 504 define a pivot axis 506 and support the cover 222 for pivotal movement relative to the gearbox housing 142 between the first and second positions, which are closed positions of the cover. The cover 222 can also assume any one of a plurality of open positions intermediate the first and second closed positions, as shown in FIG. 24, for example.

At its narrower end 508 the main body portion 500 of the cover 222 is cut out with slots to form a latching section 510 of the cover. The latching section 510 includes two gripping ears 512 that project from the main body portion 500. The ears 512 are resiliently movable relative to the main body portion 500 of the cover 222 and relative to each other.

The ears 512 have a first position, in their free state, when no force is applied to them. In this position, the ears 512 are resiliently biased away from each other, as shown in solid lines in FIG. 25. The ears 512 have a second position, when force is applied to move them toward each other, for example by pinching or compressing them together, as shown in solid lines in FIG. 26. The ears 512 can also assume any position intermediate the first and second positions, depending on the amount of force applied to them and whether they are restrained from movement.

The gearbox housing 142 has a first latching portion 516 for holding the cover 222 in the first position. The first latching portion 516 includes a notch 518 that is formed between two camming surfaces 520 on the housing 142. The notch 518 opens into a retaining slot 522 that is located behind the notch 518 and that is not separately visible. Similarly, the gearbox housing 142 has a second latching portion 526 (FIGS. 22 and 25) for holding the cover 222 in the second position. The second latching portion 526 includes a notch 528 that is formed between two camming surfaces 530 on the housing 142. The notch 528 opens into a retaining slot 532 that is located behind the notch.

The cover 222 can be releasably latched in either the first position or the second position relative to the gearbox housing 142. The cover 222 is normally left in either the first position or the second position by the user. If the cover 222 is disposed in the second position, as shown in FIGS. 23–26, the ears 512 are disposed in the retaining slot 532 in the latching portion 526. When it is desired to move the cover out of the first position, the ears 512 are pinched together (moved toward each other), against the inherent bias of the material of the cover 222.

As the two ears 512 are brought toward each other, their combined width decreases so that they are able to fit through the notch 528. The cover 222 is pulled so that the ears 512 come out of the retaining slot 532 through the notch 528. The cover 222 is then in an open position, for example, as shown in FIG. 24. In this open position, when the ears 512 are released, they spring back outwardly, away from each other, to their free state, in which their combined width is greater than the width of the notch 528.

When it is desired to move the cover 222 back into the second position, the cover is pushed against the second latching portion 526 of the housing 142. The ears 512 engage the camming surfaces 530. The ears 512 are cammed inwardly so that their combined width decreases to the width of the notch 528. The ears 512 move through the notch 528 into the receiving slot 532. The ears 512 then spring back outward into engagement with the slot 532. The resilience of the ears 512 holds them in the slot 532, thus latching the cover 222 in the first position. The latching section 510 of the cover and the second latching portion 526 of the housing 142 together constitute a first latch that holds the cover 222 in the first closed position.

The above description with regard to moving the cover 222 into and out of the second position applies in a similar fashion to moving the cover into and out of the first position. The latching section 510 of the cover 222 and the second latching portion 516 of the housing 142 together constitute a second latch that holds the cover in the second closed position.

As noted above, the movable portion 22 of the head end 14 includes a frame structure, or frame 60. The bed 14 end may be used with a multi-piece cover for the frame 60, for example, the cover 430 shown in FIG. 20. Such a cover 430 has seams between the pieces 432 and 434 of the cover. In this case, it is possible that when the bed end 14 is washed, water can enter the bed end through the seams between the main panel 432 and the end caps 434. It is desirable that this water not accumulate in the bed end 14.

Figure 27:
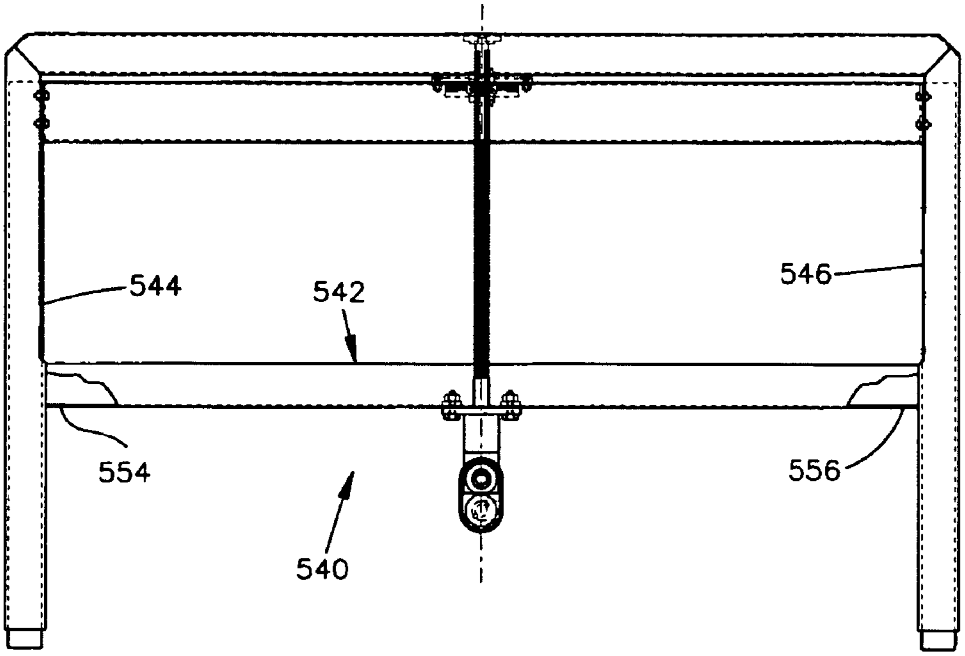
FIG. 27 is a schematic elevational view of a frame that forms part of the bed end and including two drain openings in the frame.
Figure 28:
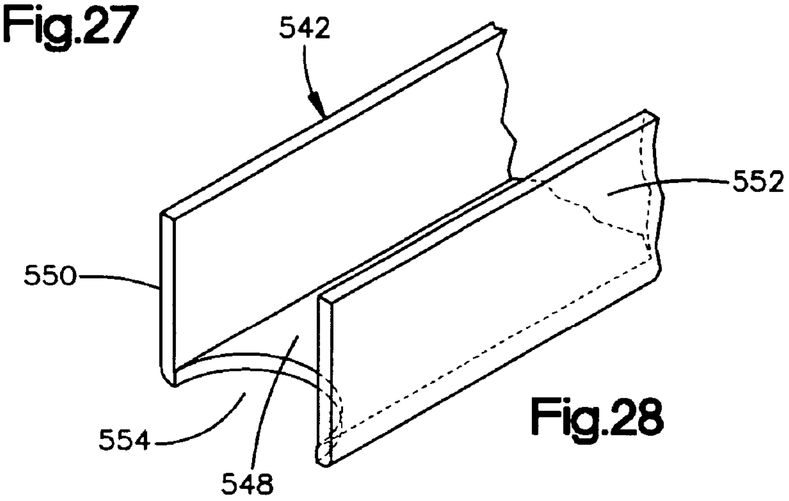
FIG. 28 is a schematic perspective view of a portion of the frame of FIG. 27 showing one of the drain openings.
Figure 29:
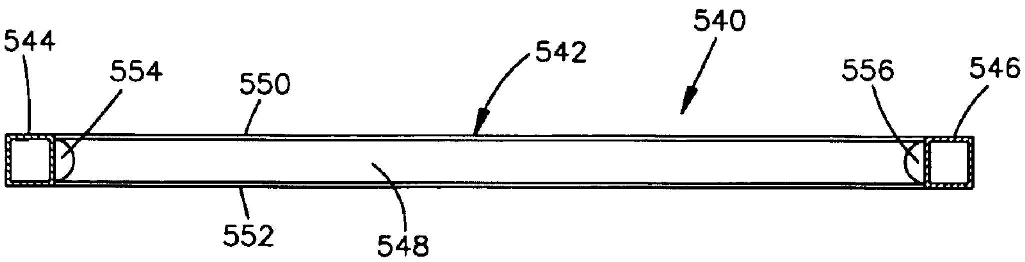
FIG. 29 is a top plan view of a portion of the frame of FIG. 27.

In accordance with a feature of the invention, therefore, the bed end 14 may be provided with one or more drain openings for draining water or other liquids out of the bed end. FIGS. 27–29 illustrate portions of a bed frame 540 that is constructed in accordance with this feature of the invention.

The bed end 540 includes a lower cross bar 542 which has a tubular cross-sectional configuration that extends perpendicular to side rails or legs 544 and 546 and parallel to the floor. The tubular configuration is U-shaped including a base (bottom) wall 548 and two upstanding side walls 548 that define between them a channel in the cross bar 542. At least one drain opening is formed in the base wall 548 of the lower cross bar 542. In the illustrated embodiment, two drain openings 554 and 556 are formed, spaced apart at either end of the cross bar 542. The openings 554 and 556 are semi-circular or half moon in shape, and abut the side rails 544 and 546, respectively, of the frame.

Because the drain openings 554 and 556 are in the base wall 548 of the cross bar 542, any water that may accumulate in the bed end 540 as a result of washing the bed end, for example, can easily drain out. If the bed end 540 is tipped to one side or the other, the water will drain to one end or the other of the cross bar 542 and drain out of the drain opening 554 or 546. Of course, other shapes and placements of drain openings in accordance with the invention are possible.

Figure 35:
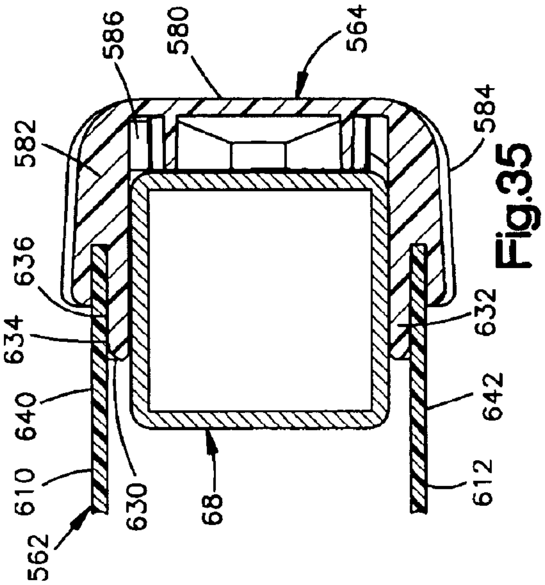
FIG. 35 is a sectional view illustrating engagement of the end cap with a center panel of the cover.
Figure 36:
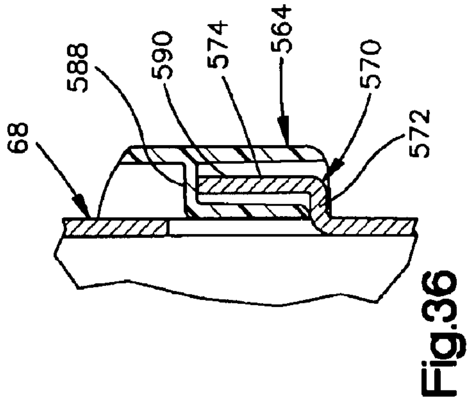
FIG. 36 is a fragmentary sectional view illustrating attachment of the end cap to the frame.

In accordance with one feature of the invention, end caps for a bed end of the present invention are secured to the side rail of the bed frame in a manner as described below. This feature is applicable to a multi-piece bed end cover, for example, the bed end cover 560 (FIG. 20) that is a plastic bed end cover constructed in accordance with the present invention. The cover 560 is a hollow cover for enclosing and covering the operational and structural assembly or parts of a bed end. The cover 560 has a three-piece plastic construction including a central panel 562 and two identical end caps 564 (only one of which is shown). The cover 560 is adapted to fit onto a frame 60 (FIG. 2) having outer legs or side rails 66 and 68. Each of the side rails 66 and 68 has a square cross-sectional configuration as can be seen in FIG. 35. The side rails 66 and 68 are similar in construction and so only the one side rail 68, and the attachment of its associated end cap, is described.

The side rail 68 has a tongue 570 that is located near the lower end of the side rail, adjacent the cross bar 64. The tongue 570 has an L-shaped configuration including a base leg 572 that projects outward from the side rail 68 and a main leg 574 that projects upward from the end of the base leg. The main leg 574 of the tongue 570 thus extends in a direction parallel to the length of the side rail 68.

The end cap 564 has a generally U-shaped cross-sectional configuration including a base wall 580 and two side walls 582 and 584. The side walls extend generally parallel to each other from opposite ends of the base wall 584. The three walls together define a cavity or chamber 586 in the end cap 564.

The end cap 564 has an inner wall portion 588 that is formed as one piece with the remainder of the end cap. The inner wall portion 588 is located at the bottom of the end cap, inside the cavity 586 of the end cap 564. The inner wall portion 588 is spaced inward from the base wall 580 of the end cap 564 and defines a small opening or space 590 between the base wall and the inner wall portion.

When the end cap 564 is mounted on the side rail 68, the inner wall portion 588 of the end cap 564 extends over the tongue 570 of the side rail. The tongue 570 of the side rail 68 fits closely into the small opening 590 between the inner wall portion 588 of the end cap 564 and the base wall 580 of the end cap. The engagement of the tongue 570 with the inner wall portion 588 helps to support the end cap 564 on the side rail 68. The dimensions of the tongue 570 are selected so that the tongue supports the lower end of the end cap 564 in a solid and stable manner on the side rail 68.

Figure 34:
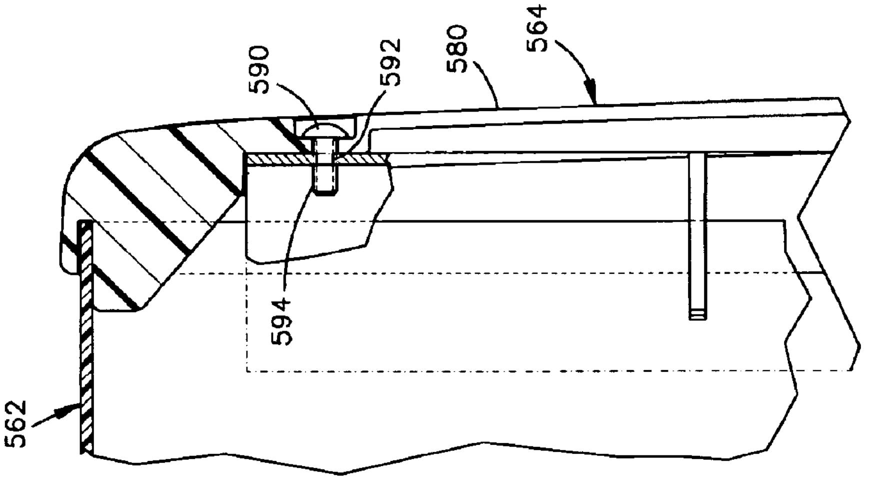
FIG. 34 is a view similar to FIG. 33 illustrating another manner of attachment of the end cap to the frame.

The opposite upper end of the end cap 564 is also secured to the side rail 68. Preferably, this takes place with a single (one and only one) fastener. The single fastener may be a screw 590 as shown in FIG. 34. The screw 590 extends through a single fastener opening 592 in the end cap 564 and into a threaded opening 594 in the side rail 68. The combination of the single fastener 590 plus the engagement of the end cap 564 with the tongue 570, is sufficient to secure the end cap to the side rail 68. The end cap 564 can be easily removed from the side rail 68 by unscrewing the screw 590 and lifting the end cap off the tongue 570.

Figure 33:
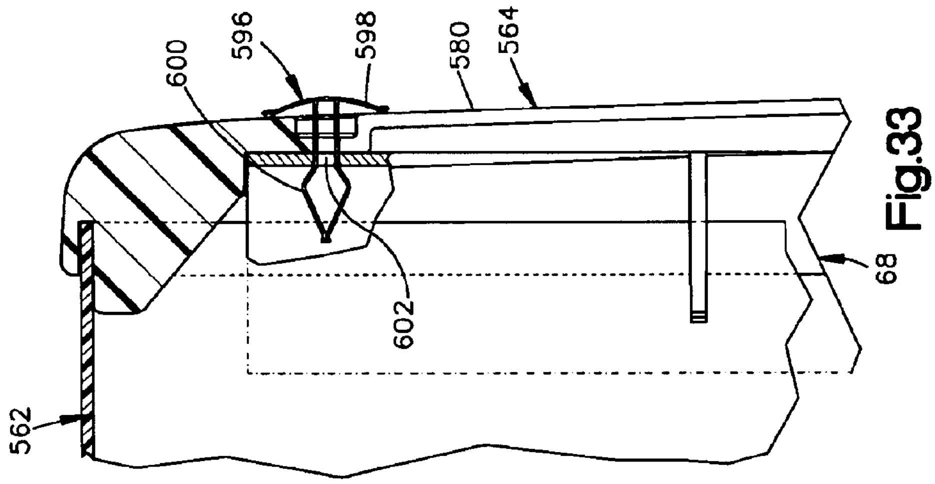
FIG. 33 is an enlarged partial sectional view illustrating one manner of attachment of the end cap to the frame.

The single fastener may be other than a screw. For example, FIG. 33 shows a push-type fastener 596 of the kind often used for fastening panels and boards and the like. The fastener 596 has a head 598 that engages the base wall 580 of the end cap 564. A resiliently deformable portion 600 of the fastener 596 extends through an opening 602 in the side rail 68. The engagement of the fastener 596 with the side rail 68 holds the upper end of the end cap 564 firmly in place on the side rail 68. The fastener 596 may also be of the type that can be pre-assembled with the end cap 564 in a manner so that the head 598 is hidden inside the end cap and the end cap thus presents a clean, fastener-free appearance from the outside.

As noted above, the central panel 562 is a one-piece plastic extrusion. The central panel 562 includes an interior major side panel 610 that faces the opposite end of the bed 10 when assembled, and an opposite exterior major side panel 612. The side panels 610 and 612 are joined by an upper edge panel in an upside-down U-shaped configuration to form the central panel 562. When the cover 560 including the central panel 562 and the end caps 564 is assembled on the frame of the bed end, the major side panels 610 and 612 each have a curved configuration rather than a planar configuration. The major side panels 610 and 612 are, preferably, formed during extrusion with this curved configuration. A preferred material for the panel 562 is PVC that is extruded into the form required then frozen into shape over a mold as it cools. Alternatively, the panel could be roll formed out of steel and painted to match. Plastic is preferred for economic and durability reasons; it does not dent like steel and the color match material can hide scratches.

Figure 31:
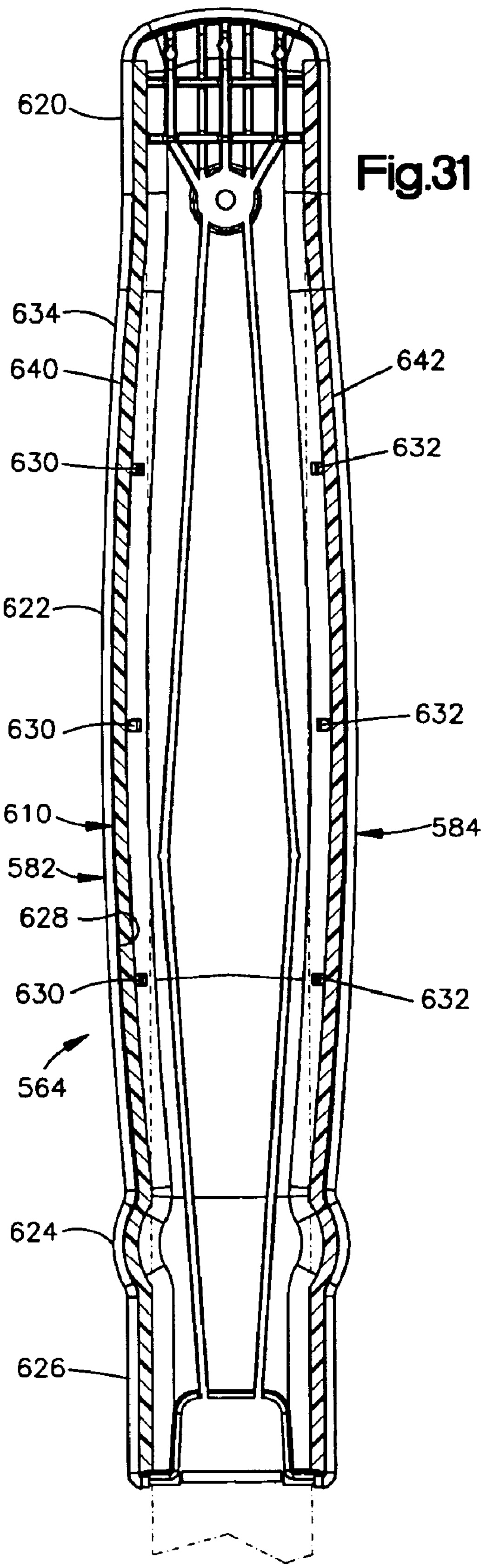
FIG. 31 is a sectional view through portions of the cover including an end cap.
Figure 32:
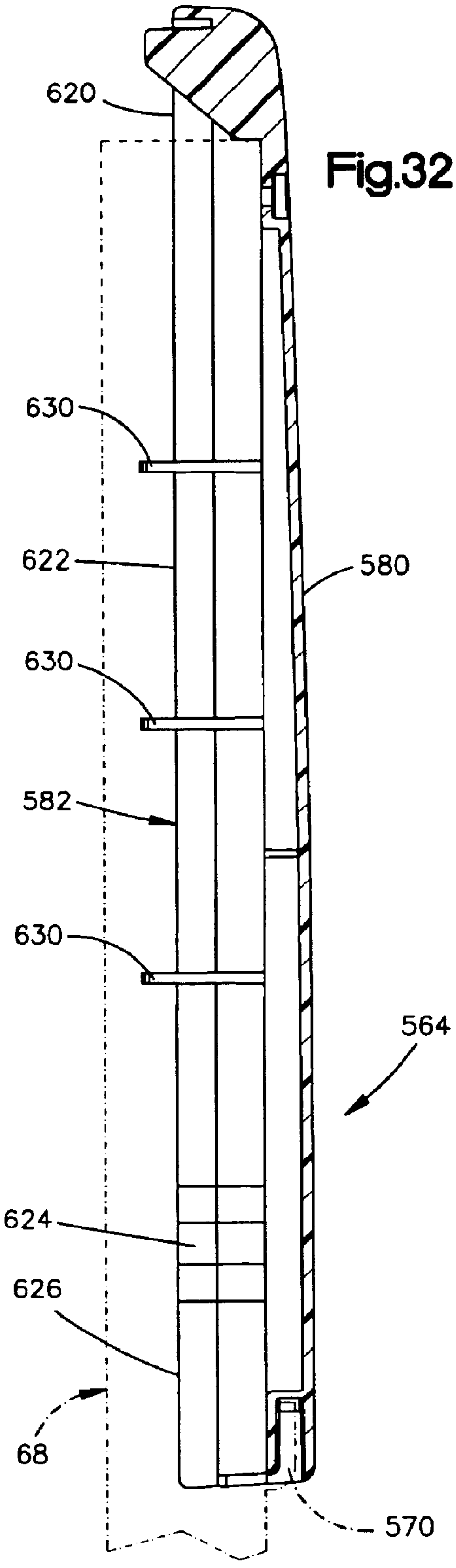
FIG. 32 is another sectional view of the end cap of FIG. 31.

To help the panels 610 and 612 maintain this curved configuration during use of the bed, rather than possibly being flattened out, the panels are engaged with the bed end caps 564, in a manner as follows. The side walls 582 and 584 of the end cap 564 have a non-planar, or curved, configuration, as can be seen in FIG. 31, for example. The side wall 582, which is exemplary, is planar in an upper section 620, then is bowed out for a central section 620 that extends for most of the vertical extent of the side wall. The bowed section 622 terminates in an outwardly projecting cylindrical boss 624. Below the boss 624, is a lower planar section 626 at the bottom end of the side wall 582. All along this length, the side wall 582 has an inner surface 628 that has the same curved configuration.

The end cap 564 has portions that hold the inner major side panel 610 of the central panel 562 of the cover 560, against the curved inner surface 628 of the side wall 582, forcing the major side panel 610 to assume this same curved configuration. Specifically, the end cap 564 has a plurality of fingers 630 adjacent the first side wall 582. The fingers 630 are molded as one piece with the end cap 564. The fingers 630 are portions of the end cap 564 that project from the side wall 582 in a direction parallel to but spaced apart from the side wall. In the illustrated embodiment, there are three fingers 630 adjacent to the first side wall 582. There are also three fingers 632 adjacent to the second side wall 584, on the opposite side of the end cap 564.

The end cap 564 thus has a channel 634 that is defined between the fingers 630 and the inner surface 628 of the side wall 582. The fingers 630 have outer surfaces 636 that are arranged in the same bowed configuration as the inner surface of the central section 622 of the side wall. As a result, the channel 634 has the same curved or bowed configuration that is presented by the side wall 582 itself.

Each one of the major side panels 610 and 612 of the central panel 562 of the cover 560 has an edge portion that is located adjacent to the side rail 68 when the central panel is installed or assembled on the frame. The inner major side panel 610 has an edge portion 640, and the outer major side panel 612 has an edge portion 642.

The edge portion 640 extends into the channel 634 between the fingers 630 and the first side wall 582. The edge portion 640 of the inner major side panel 610 is captured between the fingers 630 of the end cap 564 and the first side wall 582. As a result, the edge portion 640 assumes the same curved configuration as the channel 634 and as the side wall 582 of the end cap 564.

Figure 30:
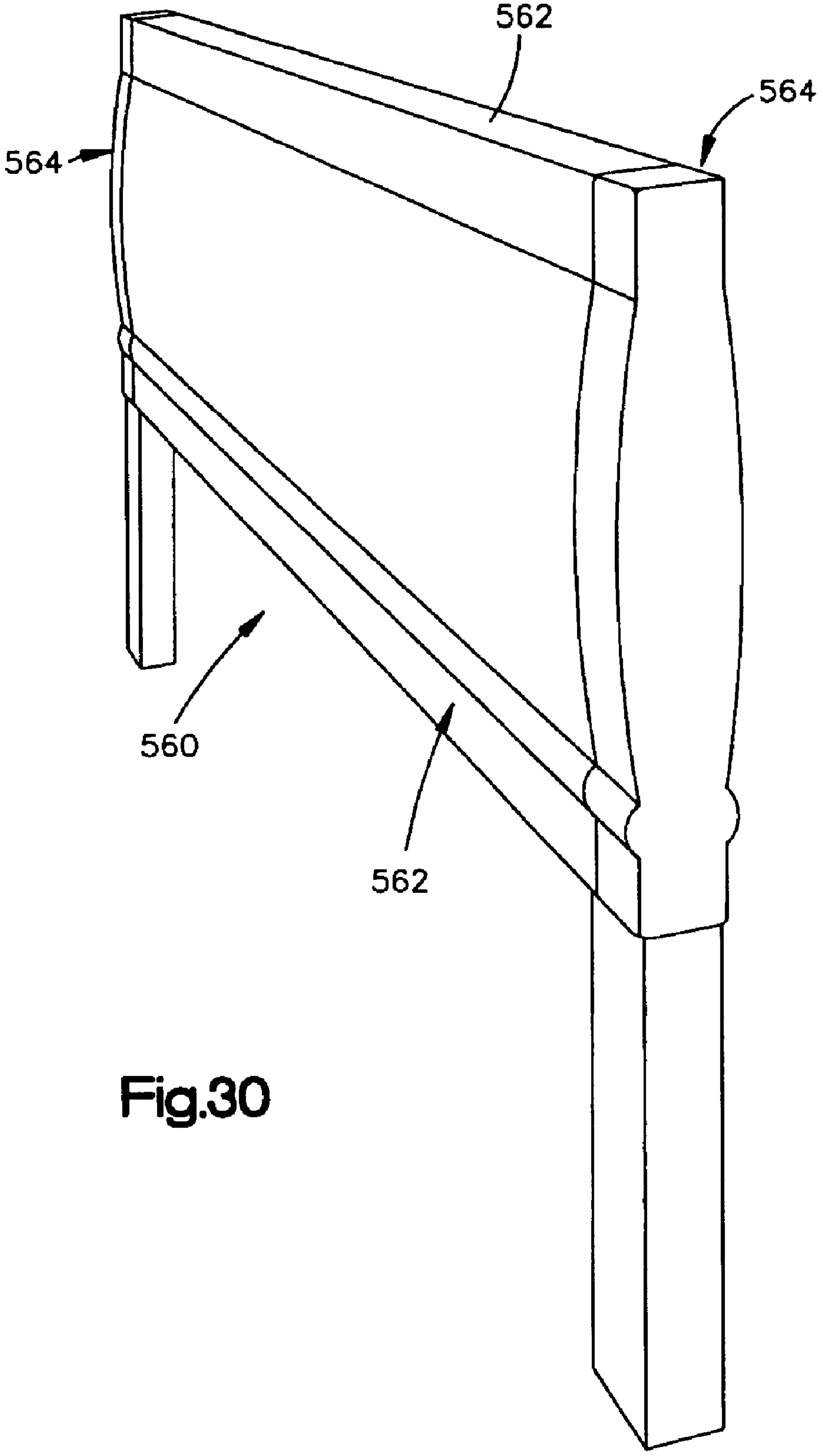
FIG. 30 is a perspective view of a bed end including a removable cover in accordance with the invention.

On the opposite end of the central panel 562 (to the left as viewed in FIG. 30), the other end cap 564, in a similar manner, imparts the same curved configuration to the opposite end of the inner major side panel 610 of the central panel. Because of the material characteristics of the central panel 562, this curved configuration is constant and extends all the way across the width of the central panel, between the end caps 564. The fingers 630 help to support the panel 610 against deflection.

In a similar manner, the second side wall 584 of the end cap 564 cooperates with the second plurality of fingers 632 to define a channel between them with a curved configuration that matches the curved configuration of the second side wall. The edge portion 642 of the outer major side panel 612 is captured between the fingers 632 of the end cap and the second side wall 584. The edge portion 642 extends into the channel that is defined between the fingers 632 and the second side wall 584. As a result, the edge portion 640 assumes the same curved configuration as the second side wall 582 of the end cap 564. In addition, the fingers 632 help to support the panel 612 against deflection.

In this manner, the two major side panels 610 and 612 have identical curved configurations. This can enable placement of the bed end 14 at either the foot end of the bed 10, or the head end of the bed, while preserving the same appearance.

In the illustrated embodiment, the edge portions 640 and 642 of the central panel 562 overlie the side rails 66 and 68 of the frame, as can be seen in FIG. 35. This arrangement may not be necessary. For example, the edge portions 640 and 642 could be held back away inward from the side rail 68 (to the left as viewed in FIG. 35); it would then be necessary for the fingers and the side walls of the end cap to extend inward farther past the side rail 68, so as to capture the edge portions of the central panel. In either case, the panel edge portions are considered to be adjacent the side rail, that is, they are close enough to be captured and curved by the end cap 564.

In the illustrated embodiment, the fingers are located directly between the side rail 68 and the edge portions 640 and 642 of the main panel 562. If the edge portions 640 and 642 were located inward from the side rail 68 (to the left as viewed in FIG. 35), as described above, the fingers would be between the edge portion and an imaginary inward projection of the side rail. In either case, the fingers are considered to be between the side rail 68 and the edge portions 640 and 642 of the main panel 562.

In the illustrated embodiment, the end cap 564 has a generally U-shaped cross-sectional configuration, for example, as seen in FIG. 35. In other embodiments, the end cap 564 could have a different configuration. For example, the end cap 564 could have a generally C-shaped configuration, with the base wall 580 being curved rather than planar. The C-shaped configuration would still include a base wall and side walls that capture the edge portions of the central panel to provide them with the desired curved configuration.

From the above description of the invention, those skilled in the art will perceive improvements, changes, and modifications in the invention. Such improvements, changes, and modifications within the skill of the art are intended to be included within the scope of the appended claims.

Having described the invention, we claim:

1. A gear box for a bed end, comprising:

a housing;

first and second input shafts in said housing for receipt of rotational force for operating said gear box; and a cover associated with said housing and having a first closed position covering said first input shaft and enabling access to said second input shaft, and a second closed position covering said second input shaft and enabling access to said first input shaft.

2. A gear box as set forth in claim 1 wherein said cover pivots on said housing between the first closed position and the second closed position about a pivot axis.

3. A gear box as set forth in claim 1 wherein said cover includes first and second ears that are resiliently movable relative to each other to enable movement of said cover into and out of said first and second closed positions.

4. A gear box as set forth in claim 3 wherein said ears are movable closer to each other to enable movement of said cover into and out of said first and second closed positions and are movable away from each other to enable latching of said cover in one of said first and second closed positions.

5. A gear box as set forth in claim 1 including a first latch that releasably holds said cover in the first closed position and a second latch that releasably holds said cover in the second closed position, said first latch including a first latching portion of said housing that is engageable with a latching section of said cover, and said second latch including a second latching portion of said housing that is engageable with said latching section of said cover.

6. A gear box as set forth in claim 5 wherein said latching section of said cover includes first and second ears that are resiliently movable relative to each other to enable movement of said cover into and out of said first and second closed positions.

7. A gear box as set forth in claim 6 wherein said cover has an open position intermediate said first and second closed positions, each one of said latching portions of said housing including at least one camming surface for moving said ears toward each other upon movement of said latching section of said cover from the open position into one of the first and second closed positions.

8. A gear box as set forth in claim 1 wherein:

said cover is supported on said housing for pivotal movement about a pivot axis relative to said housing between the first closed position and the second closed position; and said cover includes first and second ears that are resiliently movable relative to each other to enable movement of said cover into and out of said first and second closed positions.

9. A gear box as set forth in claim 8 including a first latch that releasably holds said cover in the first closed position and a second latch that releasably holds said cover in the second closed position;

said first latch including a first latching portion of said housing that is engageable with a latching section of said cover, and said second latch including a second latching portion of said housing that is engageable with said latching section of said cover;

said latching section of said cover including first and second ears that are resiliently movable relative to each other to enable movement of said cover into and out of said first and second closed positions; and said cover having an open position intermediate said first and second closed positions, each one of said latching portions of said housing including at least one camming surface for moving said ears toward each other upon movement of said latching section of said cover from the open position into one of the first and second closed positions.

10. A gear box as set forth in claim 1 wherein the cover is associated with a primary opening on the gearbox housing, and the gearbox housing also has a secondary opening for enabling access to one of the first and second input shafts by a manual crank.

11. A gear box as set forth in claim 10 further including a manual crank engageable through the secondary opening with the first input shaft and being removable from the first input shaft and thereby from the gear box of the bed end.

12. A gear box as set forth in claim 10 wherein the cover enables access to a first end portion of the first input shaft, and the secondary opening enables access to an opposite second end portion of the first input shaft.

13. A gear box as set forth in claim 12 further including a second cover supported on the gearbox housing and selectively movable to cover or open the secondary opening.

14. A gear box as set forth in claim 1 further including a manual hi-lo crank that includes a securing mechanism for releasably securing the manual crank to the gear box.

15. A gear box as set forth in claim 14 wherein the securing mechanism comprises a detent member engageable with the first input shaft to resist removal of the manual crank from the height adjustment mechanism without application of a strong pulling force.

16. A gear box as set forth in claim 14 wherein the securing mechanism comprises a detent member having a resilient portion that resiliently engages a portion of the first input shaft.

17. A gear box as set forth in claim 16 wherein the securing mechanism comprises a wire spring member.

18. A gear box as set forth in claim 1 having a main body portion that encloses the first and second input shafts and having an output portion that projects from the main body portion and that is adapted to be secured to the frame of a bed end.

19. A gear box as set forth in claim 18 wherein the output portion has a chamber adapted to receive an output shaft that is rotatable with a lead screw of the bed end, the lead screw and the frame and the gearbox being movable vertically upon raising and lowering movement of the bed.

20. A gear box as set forth in claim 19 wherein the housing has first and second shaft chambers for receiving the first and second output shafts, respectively.

21. A gear box as set forth in claim 18 wherein the primary opening in the gear box housing opens into an input shaft chamber that extends transversely to and communicated with the output chamber.

22. A gear box as set forth in claim 1 wherein the gear box is adapted to be secured to a frame of a bed end for vertical movement with the bed end frame.

23. An assembly including at least first and second gear boxes, each gear box including a housing, first and second input shafts in the housing for receipt of rotational force for operating the gear box, and a cover associated with the housing and having a first closed position covering the first input shaft and enabling access to the second input shaft and a second closed position covering the second input shaft and enabling access to the first input shaft.

* * * * *